(12) United States Patent
Bhise et al.

(10) Patent No.: US 12,447,130 B2
(45) Date of Patent: Oct. 21, 2025

(54) CAPSULES AND CAPSULE COATINGS FOR GASTRIC RESIDENCE DOSAGE FORMS

(71) Applicant: Lyndra Therapeutics, Inc., Watertown, MA (US)

(72) Inventors: Nupura Bhise, Watertown, MA (US); Erick Peeke, Cambridge, MA (US); Marlene Schwarz, Auburndale, MA (US); Megan Bishoff, Boston, MA (US); Sonia Holar, Boston, MA (US); David Altreuter, Wayland, MA (US)

(73) Assignee: LYNDRA THERAPEUTICS, INC., Watertown, MA (US)

( * ) Notice: Subject to any disclaimer, the term of this patent is extended or adjusted under 35 U.S.C. 154(b) by 833 days.

(21) Appl. No.: 17/593,436

(22) PCT Filed: Mar. 19, 2020

(86) PCT No.: PCT/US2020/023704
§ 371 (c)(1),
(2) Date: Sep. 17, 2021

(87) PCT Pub. No.: WO2020/191229
PCT Pub. Date: Sep. 24, 2020

(65) Prior Publication Data
US 2022/0160642 A1 May 26, 2022

Related U.S. Application Data

(60) Provisional application No. 62/821,352, filed on Mar. 20, 2019.

(51) Int. Cl.
*A61K 9/48* (2006.01)
(52) U.S. Cl.
CPC ............ *A61K 9/4891* (2013.01); *A61K 9/485* (2013.01); *A61K 9/4866* (2013.01)
(58) Field of Classification Search
CPC .... A61K 9/4891; A61K 9/4833; A61K 9/485; A61K 9/4858; A61K 9/4866; A61K 45/06
See application file for complete search history.

(56) References Cited

U.S. PATENT DOCUMENTS

| | | | |
|---|---|---|---|
| 6,200,603 B1 | 3/2001 | Rowe et al. | |
| 9,737,905 B2 | 8/2017 | Byron et al. | |
| 9,827,203 B2 | 11/2017 | Stella et al. | |
| 10,182,985 B2 | 1/2019 | Bellinger et al. | |
| 10,413,507 B2 | 9/2019 | Zhang et al. | |
| 10,517,819 B2 | 12/2019 | Bellinger et al. | |
| 10,517,820 B2 | 12/2019 | Bellinger | |
| 10,532,027 B2 | 1/2020 | Bellinger | |
| 10,596,110 B2 | 3/2020 | Bellinger | |
| 10,610,482 B2 | 4/2020 | Bellinger | |
| 10,716,751 B2 | 7/2020 | Bellinger et al. | |
| 10,716,752 B2 | 7/2020 | Bellinger et al. | |
| 10,849,853 B2 | 12/2020 | Bellinger et al. | |
| 10,953,208 B2 | 3/2021 | Zhang et al. | |
| 11,077,056 B2 | 8/2021 | Bellinger et al. | |
| 11,083,690 B2 | 8/2021 | Zhang et al. | |
| 11,246,829 B2 | 2/2022 | Bellinger et al. | |
| 11,357,723 B2 | 6/2022 | Bellinger et al. | |
| 11,389,399 B2 | 7/2022 | Bellinger et al. | |
| 11,576,859 B2 | 2/2023 | Kanasty et al. | |
| 11,576,866 B2 | 2/2023 | Bellinger et al. | |
| 11,793,751 B2 | 10/2023 | Grant et al. | |
| 11,992,552 B2 | 5/2024 | Bellinger | |
| 12,023,406 B2 | 7/2024 | Kanasty | |
| 12,109,305 B2 | 10/2024 | Bellinger | |
| 12,142,158 B2 | 11/2024 | Kanasty | |
| 2005/0064027 A1 | 3/2005 | Jacob et al. | |
| 2006/0257484 A1 | 11/2006 | Hwang et al. | |
| 2008/0206145 A1* | 8/2008 | Afargan | A61K 49/1818 424/9.4 |
| 2009/0304768 A1 | 12/2009 | Lapidot et al. | |
| 2010/0064100 A1 | 3/2010 | Bains | |
| 2011/0091542 A1* | 4/2011 | Navon | A61P 25/30 514/567 |
| 2015/0366815 A1 | 12/2015 | Teles | |
| 2016/0317796 A1 | 11/2016 | Zhang et al. | |

(Continued)

FOREIGN PATENT DOCUMENTS

CN 102300463 A 12/2011
JP 2006508021 A 3/2006

(Continued)

OTHER PUBLICATIONS

Extended European Search Report, dated Dec. 13, 2022, for European Patent Application No. 20773419.5, 9 pages.
Partial Supplementary Search Reports, dated Mar. 29, 2023, for European Patent Application No. 20774505.0, 12 pages.
International Preliminary Report on Patentability, issued Sep. 16, 2021, for PCT Application No. PCT/US2020/023704, filed Mar. 19, 2020, 8 pages.
International Search Report and Written Opinion, mailed Jun. 3, 2020, for PCT Application No. PCT/US2020/0023710, filed Mar. 19, 2020, 10 pages.
International Preliminary Report on Patentability, issued Sep. 16, 2021, for PCT Application No. PCT/US2020/0023710, filed Mar. 19, 2020, 7 pages.
International Search Report and Written Opinion, mailed May 27, 2020, for PCT Application No. PCT/US2020/023704, iled Mar. 19, 2020, 11 pages.

(Continued)

*Primary Examiner* — Michael P Cohen
(74) *Attorney, Agent, or Firm* — MORRISON & FOERSTER LLP

(57) ABSTRACT

Provided are gastric residence dosage forms comprising: a gastric residence system in a folded configuration; a capsule encapsulating the gastric residence system in a folded configuration; and a coating on the capsule, wherein the gastric residence dosage form is configured to release the gastric residence system in a stomach of a patient, allowing the gastric residence system to assume an open configuration. The coating on the capsule includes a polymer, an anti-tacking agent, and/or a hydration aid.

20 Claims, 14 Drawing Sheets

(56) References Cited

U.S. PATENT DOCUMENTS

| | | |
|---|---|---|
| 2017/0106099 A1 | 4/2017 | Bellinger |
| 2017/0128576 A1 | 5/2017 | Zhang et al. |
| 2017/0135954 A1 | 5/2017 | Bellinger et al. |
| 2017/0266112 A1 | 9/2017 | Bellinger et al. |
| 2018/0311154 A1 | 11/2018 | Bellinger et al. |
| 2019/0000768 A1 | 1/2019 | Shimokawa |
| 2019/0070107 A1 | 3/2019 | Bellinger et al. |
| 2019/0070108 A1 | 3/2019 | Bellinger et al. |
| 2019/0070143 A1 | 3/2019 | Boulas et al. |
| 2019/0125667 A1 | 5/2019 | Bellinger et al. |
| 2019/0133936 A1 | 5/2019 | Bellinger et al. |
| 2019/0175500 A1 | 6/2019 | Bellinger et al. |
| 2019/0231697 A1 | 8/2019 | Bellinger et al. |
| 2019/0254966 A1 | 8/2019 | Bellinger et al. |
| 2019/0262265 A1 | 8/2019 | Bellinger et al. |
| 2019/0298652 A1 | 10/2019 | Bellinger et al. |
| 2020/0030234 A1 | 1/2020 | Zhang et al. |
| 2020/0085736 A1 | 3/2020 | Bellinger et al. |
| 2020/0085737 A1 | 3/2020 | Bellinger et al. |
| 2020/0146979 A1 | 5/2020 | Kanasty |
| 2020/0281851 A1 | 9/2020 | Grant et al. |
| 2021/0093564 A1 | 4/2021 | Bellinger et al. |
| 2021/0113460 A1 | 4/2021 | Bellinger et al. |
| 2021/0128460 A1 | 5/2021 | Bellinger et al. |
| 2021/0177750 A1 | 6/2021 | Bellinger et al. |
| 2021/0196627 A1 | 7/2021 | Grant et al. |
| 2022/0093006 A1 | 3/2022 | Kanasty et al. |
| 2022/0192995 A1 | 6/2022 | Kanasty et al. |
| 2022/0387310 A1 | 12/2022 | Altreuter et al. |
| 2022/0387311 A1 | 12/2022 | Kanasty et al. |
| 2022/0387312 A1 | 12/2022 | Kanasty et al. |
| 2022/0409528 A1 | 12/2022 | Kanasty et al. |
| 2023/0039421 A1 | 2/2023 | Bellinger et al. |
| 2023/0190941 A1 | 6/2023 | Montezco et al. |
| 2024/0139102 A1 | 5/2024 | Grant |
| 2024/0252483 A1 | 8/2024 | Bhise |
| 2024/0335400 A1 | 10/2024 | Beguin |
| 2024/0342081 A1 | 10/2024 | Bellinger |
| 2024/0382418 A1 | 11/2024 | Kanasty |
| 2024/0390270 A1 | 11/2024 | Kanasty |
| 2024/0398701 A1 | 12/2024 | Kanasty |
| 2024/0423909 A1 | 12/2024 | Bellinger |

FOREIGN PATENT DOCUMENTS

| | | |
|---|---|---|
| JP | 2007145756 A | 6/2007 |
| JP | 2009523175 A | 6/2009 |
| JP | 2012500230 A | 1/2012 |
| JP | 2012510987 A | 5/2012 |
| JP | 2013129669 A | 7/2013 |
| JP | 2017518308 A | 7/2017 |
| JP | 2017524662 A | 8/2017 |
| JP | 2018517735 A | 7/2018 |
| NO | 2020191231 A1 | 9/2020 |
| WO | 2003082204 A2 | 10/2003 |
| WO | 2007002518 A1 | 1/2007 |
| WO | 2007083309 A2 | 7/2007 |
| WO | 2007084818 A2 | 7/2007 |
| WO | 2010064100 A1 | 6/2010 |
| WO | 2010064139 A2 | 6/2010 |
| WO | 2010128495 A1 | 11/2010 |
| WO | 2011048494 A2 | 4/2011 |
| WO | 2015187746 A1 | 12/2015 |
| WO | 2015191920 A1 | 12/2015 |
| WO | 2015191922 A1 | 12/2015 |
| WO | 2015191925 A1 | 12/2015 |
| WO | 2016178971 A1 | 11/2016 |
| WO | 2016205270 A1 | 12/2016 |
| WO | 2017022248 A1 | 2/2017 |
| WO | 2017070612 A1 | 4/2017 |
| WO | 2017100367 A1 | 6/2017 |
| WO | 2017205844 A2 | 11/2017 |
| WO | 2017205844 A3 | 1/2018 |
| WO | 2018064630 A1 | 4/2018 |
| WO | 2018102799 A1 | 6/2018 |
| WO | 2018227147 A1 | 12/2018 |
| WO | 2019060458 A1 | 3/2019 |
| WO | 2020036972 A1 | 2/2020 |
| WO | 2020117855 A1 | 6/2020 |
| WO | 2020191229 A1 | 9/2020 |
| WO | 2021092483 A1 | 5/2021 |
| WO | 2021092484 A1 | 5/2021 |
| WO | 2021092486 A1 | 5/2021 |
| WO | 2021092487 A1 | 5/2021 |
| WO | 2021092491 A1 | 5/2021 |
| WO | 2022159529 A1 | 7/2022 |
| WO | 2022236288 A1 | 11/2022 |
| WO | 2022236289 A1 | 11/2022 |
| WO | 2023141524 A2 | 7/2023 |
| WO | 2024031023 A2 | 2/2024 |
| WO | 2024073752 A2 | 4/2024 |
| WO | 2024249946 A2 | 12/2024 |

OTHER PUBLICATIONS

Hu, Y. (Feb. 28, 2013). Pharmaceutical Formulations 2nd Edition, China Medical Science and Technology Press: Bejing, pp. 172-173, 15 pages. [English Machine Translation].

Li, H. et al. (2006). Coated Pharmaceutical Dosage Forms, China Pharmaceutical Science and Technology Press, pp. 109-111. [English Translation: Bauer, K.H. et al. (1998). "Biopharmaceutical Aspects," Chapter 5 in Coated Pharmaceutical Dosage Forms: Fundamentals, Manufacturing Techniques, Biopharmaceutical Aspects, Test Methods, And Raw Materials, CRC Press: Boca Raton, 23 pages.]

* cited by examiner

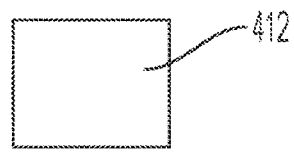
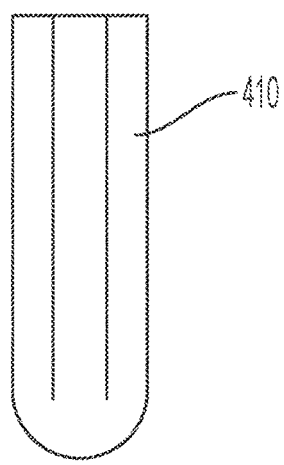
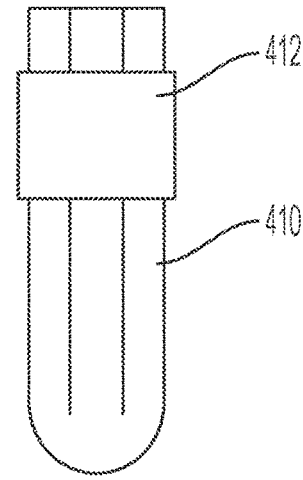
FIG. 4A
FIG. 4B
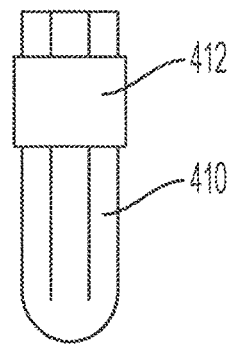
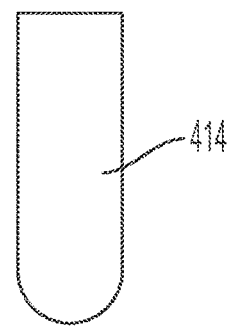
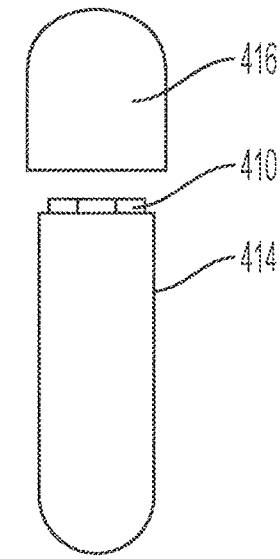
FIG. 4C
FIG. 4D

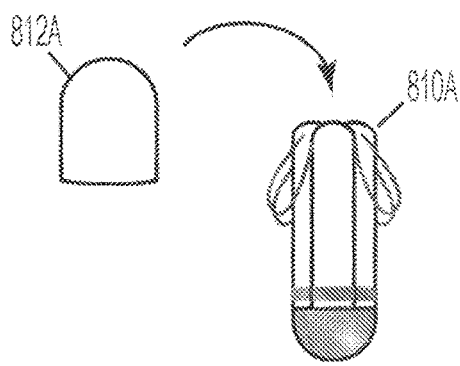
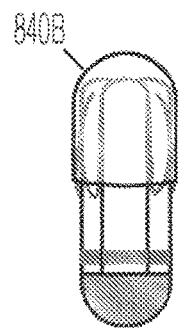
FIG. 8A　　　　　　　　　　FIG. 8B
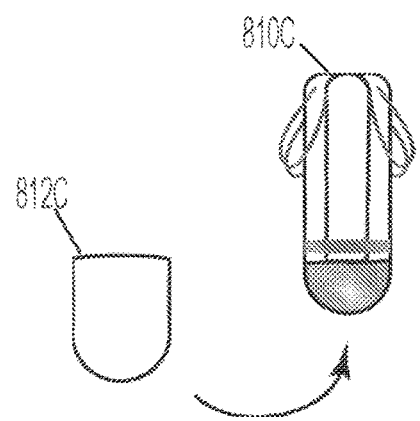
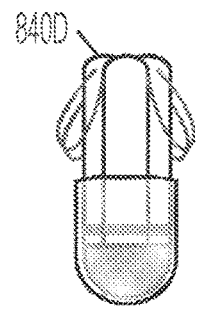
FIG. 8C　　　　　　　　　　FIG. 8D

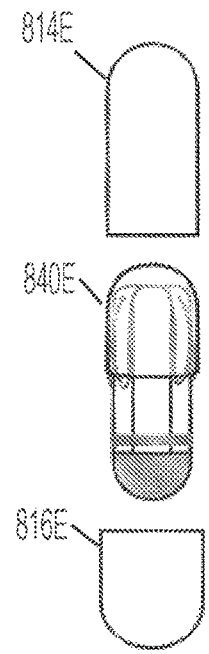 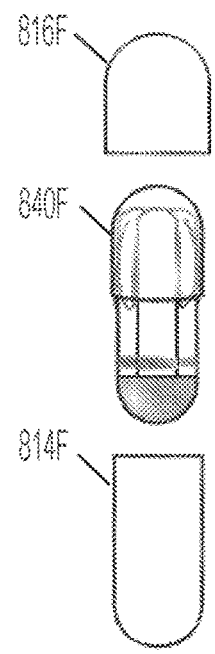
FIG. 8E  FIG. 8F
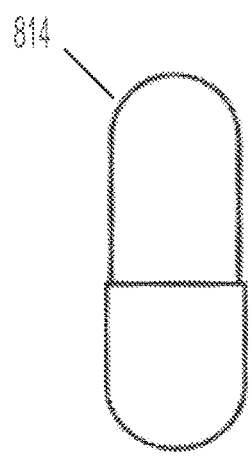
FIG. 8G

CAPSULES AND CAPSULE COATINGS FOR GASTRIC RESIDENCE DOSAGE FORMS

CROSS REFERENCE TO RELATED APPLICATIONS

This application is a national stage application under 35 U.S.C. § 371 of International Application No. PCT/US2020/023704, filed internationally on Mar. 19, 2020, which claims priority benefit of U.S. Provisional Patent Application No. 62/821,352 filed Mar. 20, 2019. The entire contents of that application are hereby incorporated by reference herein.

STATEMENT REGARDING FEDERALLY SPONSORED RESEARCH OR DEVELOPMENT

This invention was made with government support under U.S. Government contract number 1R44TR001889-01A1 awarded by the U.S. Department of Health and Human Services, National Institutes of Health, National Center for Advancing Translational Science. The government has certain rights in the invention.

FIELD OF THE INVENTION

This relates to capsules and capsule coatings, and more particularly, to capsules and capsule coatings for gastric residence dosage forms.

BACKGROUND OF THE INVENTION

Gastric residence systems are delivery systems for therapeutic agents that can remain in the stomach for days to weeks, or even over longer periods, during which time the therapeutic agent can elute from the gastric residence system for absorption in the gastrointestinal tract. Gastric residence systems are typically designed to be administered in a capsule to reach the stomach of a patient. The encapsulated gastric residence system is swallowed or introduced into the stomach by an alternate method of administration (e.g., feeding tube or gastric tube). Upon dissolution of the capsule in the stomach, the gastric residence system expands or unfolds to a size which remains in the stomach and resists passage through the pyloric valve over the desired residence period (such as three days, seven days, two weeks, etc.). Once the desired residence time expires, the expanded or unfolded dosage form may separate or otherwise become characterized by a reduced effective size (e.g., through softening and increased ability to collapse to a smaller size) and thereby pass through the pyloric valve and be expelled from the patient.

SUMMARY OF THE INVENTION

Provided are capsules and capsule coatings for gastric residence systems. Also provided are methods of preparing a gastric residence dosage form using the capsules and/or capsule coatings provided herein. In particular, capsules and capsule coatings described herein can ensure that the gastric residence system unfolds at a predetermined time and location within the gastrointestinal tract (i.e., in the stomach). For example, capsules and capsule coatings provided can minimize the risk of the gastric residence system unfolding too early (e.g., in the esophagus) and causing an obstruction. Capsules and capsule coatings described herein may also minimize the possibility of the gastric residence system passing through the stomach and unfolding later in the gastrointestinal tract (i.e., intestine). Further, capsules and capsule coatings provided herein minimize the risk of a gastric residence dosage form passing through the gastrointestinal tract without unfolding at all. In each of these possible scenarios, the therapeutic agent is not delivered to the patient as intended.

Capsules and capsule coatings provided herein may include a sleeve or band used to bind the gastric residence system in a folded configuration. In some embodiments, a bound gastric residence system may be encapsulated with a capsule to form a gastric residence dosage form. Some gastric residence dosage forms may include a reverse-enteric coating to ensure dissolution of the capsule in a gastric environment, and not prior to the gastric environment, such that the gastric residence system unfolds and assumes an open configuration within the stomach as intended.

Similarly, methods for preparing a gastric residence dosage form as provided herein can include binding a folded gastric residence system with a sleeve and encapsulating the bound gastric residence system with a capsule. In some embodiments, methods for preparing a gastric residence dosage form may also include coating the encapsulated gastric residence system with a reverse-enteric coating to ensure dissolution of the capsule and delivery of the gastric residence system within the stomach of a patient.

In some embodiments, a gastric residence dosage form is provided, the gastric residence dosage form comprising: a gastric residence system in a folded configuration; a capsule encapsulating the gastric residence system in the folded configuration; and a coating on the capsule, wherein the gastric residence dosage form is configured to release the gastric residence system in a stomach of a patient, allowing the gastric residence system to assume an open configuration.

In some embodiments of the gastric residence dosage form, the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

In some embodiments of the gastric residence dosage form, the first amount of time is at least 1 minute greater than the second amount of time.

In some embodiments of the gastric residence dosage form, the gastric residence dosage form allows the gastric residence system to assume the open configuration in at least 20 minutes when exposed to the aqueous pH 7.0 environment.

In some embodiments of the gastric residence dosage form, the gastric residence dosage form allows the gastric residence system to assume the open configuration in at least 30 minutes when exposed to the aqueous pH 7.0 environment.

In some embodiments of the gastric residence dosage form, the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

In some embodiments of the gastric residence dosage form, the third amount of time is at least 15 seconds greater than the fourth amount of time.

In some embodiments of the gastric residence dosage form, the gastric residence dosage form allows the gastric residence system to assume the open configuration in less than 30 minutes when exposed to the aqueous pH 3.0 environment.

In some embodiments of the gastric residence dosage form, the gastric residence dosage form allows the gastric residence system to assume the open configuration in less than 15 minutes when exposed to the aqueous pH 3.0 environment.

In some embodiments of the gastric residence dosage form, the gastric residence dosage form comprises a sleeve, wherein the sleeve surrounds at least a portion of the gastric residence system in the folded configuration.

In some embodiments of the gastric residence dosage form, the coating comprises a reverse-enteric polymer.

In some embodiments of the gastric residence dosage form, the reverse-enteric polymer comprises a polymethacrylate-based polymer.

In some embodiments of the gastric residence dosage form, the coating comprises an anti-tacking agent.

In some embodiments of the gastric residence dosage form, the anti-tacking agent comprises at least one of talc or magnesium stearate.

In some embodiments of the gastric residence dosage form, the coating comprises a plasticizer.

In some embodiments of the gastric residence dosage form, the plasticizer comprises at least one of a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

In some embodiments of the gastric residence dosage form, the plasticizer comprises at least one of triacetin or dibutyl sebacate.

In some embodiments of the gastric residence dosage form, the coating comprises a hydration aid.

In some embodiments of the gastric residence dosage form, the hydration aid comprises at least one of a polyvinylpyrrolidone, a vinylpyrrolidone-vinyl acetate copolymer, a polyethylene glycol, mannitol, or hydroxypropyl methylcellulose.

In some embodiments of the gastric residence dosage form, the coating comprises from 50 to 95 wt. % reverse-enteric polymer.

In some embodiments of the gastric residence dosage form, the coating comprises from 3 to 25 wt. % anti-tacking agent.

In some embodiments of the gastric residence dosage form, the coating comprises from 1 to 20 wt. % plasticizer.

In some embodiments of the gastric residence dosage form, the coating comprises from 3 to 35 wt. % hydration aid.

In some embodiments of the gastric residence dosage form, the sleeve comprises at least one of gelatin, hydroxypropyl methylcellulose, or pullulan.

In some embodiments of the gastric residence dosage form, the capsule comprises at least one of gelatin, hydroxypropyl methylcellulose, or pullulan.

In some embodiments of the gastric residence dosage form, the gastric residence dosage form is used to treat a patient.

In some embodiments of the gastric residence dosage form, the patient is a human.

In some embodiments, a coating for an encapsulated gastric residence system is provided, the coating comprising: 50-95 wt. % reverse-enteric polymer; 3-25 wt. % anti-tacking agent; and 1-20 wt. % plasticizer.

In some embodiments of the coating, the coating is on a surface of a capsule, forming a coated capsule.

In some embodiments of the coating, the coated capsule encapsulates a gastric residence system to form a gastric residence dosage form, wherein the gastric residence dosage form is configured to release the gastric residence system in a stomach of a patient, allowing the gastric residence system to assume an open configuration.

In some embodiments of the coating, the coating comprises 5 to 35 wt. % hydration aid.

In some embodiments of the coating, the hydration aid comprises at least one of a polyvinylpyrrolidone, a vinylpyrrolidone-vinyl acetate copolymer, a polyethylene glycol, mannitol, or hydroxypropyl methylcellulose.

In some embodiments of the coating, the reverse-enteric polymer comprises a polymethacrylate-based polymer.

In some embodiments of the coating, the anti-tacking agent comprises at least one of talc or magnesium stearate.

In some embodiments of the coating, the plasticizer comprises a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

In some embodiments of the coating, the plasticizer comprises at least one of triacetin and dibutyl sebacate.

In some embodiments of the coating, the coating is soluble in an aqueous solution.

In some embodiments of the coating, the coating is soluble in an organic solution.

In some embodiments of the coating, the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

In some embodiments of the coating, the first amount of time is at least 1 minute greater than the second amount of time.

In some embodiments of the coating, the gastric residence dosage form allows the gastric residence system to assume the open configuration in at least 20 minutes when exposed to the aqueous pH 7.0 environment.

In some embodiments of the coating, the gastric residence dosage form allows the gastric residence system to assume the open configuration in at least 30 minutes when exposed to the aqueous pH 7.0 environment.

In some embodiments of the coating, the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

In some embodiments of the coating, the third amount of time is at least 15 seconds greater than the fourth amount of time.

In some embodiments of the coating, the gastric residence dosage form allows the gastric residence system to assume the open configuration in less than 30 minutes when exposed to the aqueous pH 3.0 environment.

In some embodiments of the coating, the gastric residence dosage form allows the gastric residence system to assume the open configuration in less than 15 minutes when exposed to the aqueous pH 3.0 environment.

In some embodiments, a gastric residence dosage form is provided, wherein the gastric residence dosage form comprises a coating according to one or more embodiments provided herein, and the gastric residence dosage form is used to treat a patient.

In some embodiments of the gastric residence dosage form, the patient is a human.

In some embodiments, a method of making a gastric residence dosage form is provided, the method comprising: encapsulating a gastric residence system in a folded configuration with a capsule; and coating the capsule with a reverse-enteric coating to form a gastric residence dosage form.

In some embodiments of the method, the method comprises binding the gastric residence system in the folded configuration with a sleeve prior to encapsulating.

In some embodiments of the method, coating the capsule with a reverse-enteric coating comprises pan-coating the capsule.

In some embodiments of the method, the reverse-enteric coating comprises a reverse-enteric polymer, an anti-tacking agent, and a plasticizer.

In some embodiments of the method, the anti-tacking agent comprises at least one of talc or magnesium stearate.

In some embodiments of the method, the plasticizer comprises at least one of a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

In some embodiments of the method, the plasticizer comprises at least one of triacetin or dibutyl sebacate.

In some embodiments of the method, the reverse-enteric coating comprises a hydration aid.

In some embodiments of the method, the hydration aid comprises at least one of a polyvinylpyrrolidone, a vinylpyrrolidone-vinyl acetate copolymer, a polyethylene glycol, mannitol, or hydroxypropyl methylcellulose.

In some embodiments of the method, the capsule comprises at least one of gelatin, hydroxypropyl methylcellulose, or pullulan.

In some embodiments of the method, the sleeve comprises at least one of gelatin, hydroxypropyl methylcellulose, or pullulan.

In some embodiments of the method, the gastric residence dosage form is configured to release the gastric residence system in a stomach of a patient, allowing the gastric residence system to assume an open configuration.

In some embodiments of the method, the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

In some embodiments of the method, the first amount of time is at least 1 minute greater than the second amount of time.

In some embodiments of the method, the gastric residence dosage form allows the gastric residence system to assume the open configuration in at least 20 minutes when exposed to the aqueous pH 7.0 environment.

In some embodiments of the method, the gastric residence dosage form allows the gastric residence system to assume the open configuration in at least 30 minutes when exposed to the aqueous pH 7.0 environment.

In some embodiments of the method, the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

In some embodiments of the method, the third amount of time is at least 15 seconds greater than the fourth amount of time.

In some embodiments of the method, the gastric residence dosage form allows the gastric residence system to assume the open configuration in less than 30 minutes when exposed to the aqueous pH 3.0 environment.

In some embodiments of the method, the gastric residence dosage form allows the gastric residence system to assume the open configuration in less than 15 minutes when exposed to the aqueous pH 3.0 environment.

In some embodiments, a gastric residence dosage form made using the method of any embodiments provided herein, wherein the gastric residence dosage form is used to treat a patient.

In some embodiments of the gastric residence dosage form, the patient is a human.

In some embodiments, a coated dosage form is provided, the coated dosage form comprising: a dosage form; and a coating comprising a reverse-enteric polymer coating the dosage form, wherein $$\frac{\text{static coefficient of friction of coated dosage form}}{\text{static coefficient of friction of uncoated dosage form}} \leq 08.$$

In some embodiments of the coated dosage form, the coating comprises magnesium stearate.

In some embodiments of the coated dosage form, the dosage form comprises one of a tablet, a capsule, or an enrobed gastric residence system.

In some embodiments of the coated dosage form, the dosage form comprises a capsule.

In some embodiments of the coated dosage form, the capsule encapsulates a gastric residence system.

In some embodiments of the coated dosage form, the static coefficient of friction of the coated dosage form is less than 0.3.

In some embodiments of the coated dosage form, the static coefficient of friction of the coated dosage form is less than 0.2.

In some embodiments of the coated dosage form, the static coefficient of friction of the coated dosage form is less than 0.1.

In some embodiments of the coated dosage form, $$\frac{\text{static coefficient of friction of coated dosage form}}{\text{static coefficient of friction of uncoated dosage form}} \leq 05.$$

In some embodiments of the coated dosage form, the static coefficient of friction is at least 0.08 less than that of an uncoated dosage form.

In some embodiments of the coated dosage form, the static coefficient of friction of the coated dosage form is at least 0.15 less than that of an uncoated dosage form.

In some embodiments of the coated dosage form, the static coefficient of friction of the coated dosage form is at least 0.2 less than that of an uncoated dosage form.

In some embodiments of the coated dosage form, the reverse-enteric polymer comprises a polymethacrylate.

In some embodiments of the coated dosage form, the coating comprises 10 to 50 wt. % reverse-enteric polymer.

In some embodiments of the coated dosage form, the coating comprises an anti-tacking agent.

In some embodiments of the coated dosage form, the anti-tacking agent comprises talc.

In some embodiments of the coated dosage form, the coating comprises 5 to 30 wt. % anti-tacking agent.

BRIEF DESCRIPTION OF THE DRAWINGS

The invention will now be described, by way of example only, with reference to the accompanying drawings, in which:

FIG. 4A a folded gastric residence system and a sleeve, according to some embodiments:

FIG. 4B shows a sleeved gastric residence system, according to some embodiments;

FIG. 4C shows a sleeved gastric residence system and a body portion of a two-piece capsule, according to some embodiments;

FIG. 4D shows a sleeved gastric residence system placed inside a body portion of a two-piece capsule, and a cap portion of a two-piece capsule, according to some embodiments:

FIG. 8A shows a compacted/folded gastric residence system comprising a filament being sleeved on an arm side, according to some embodiments;

FIG. 8B shows a sleeved compacted/folded gastric residence system comprising a filament, according to some embodiments;

FIG. 8C shows a compacted/folded gastric residence system comprising a filament being sleeved on a core side, according to some embodiments:

FIG. 8D shows a sleeved compacted/folded gastric residence system comprising a filament, according to some embodiments;

FIG. 8E shows a compacted/folded gastric residence system comprising a filament and sleeved on an arm side being encapsulated with a two-piece capsule, according to some embodiments;

FIG. 8F shows a compacted/folded gastric residence system comprising a filament and sleeved on an arm side being encapsulated with a two-piece capsule, according to some embodiments;

FIG. 8G shows an encapsulated compacted/folded gastric residence system, according to some embodiments;

DETAILED DESCRIPTION OF THE INVENTION

Figure 1A:
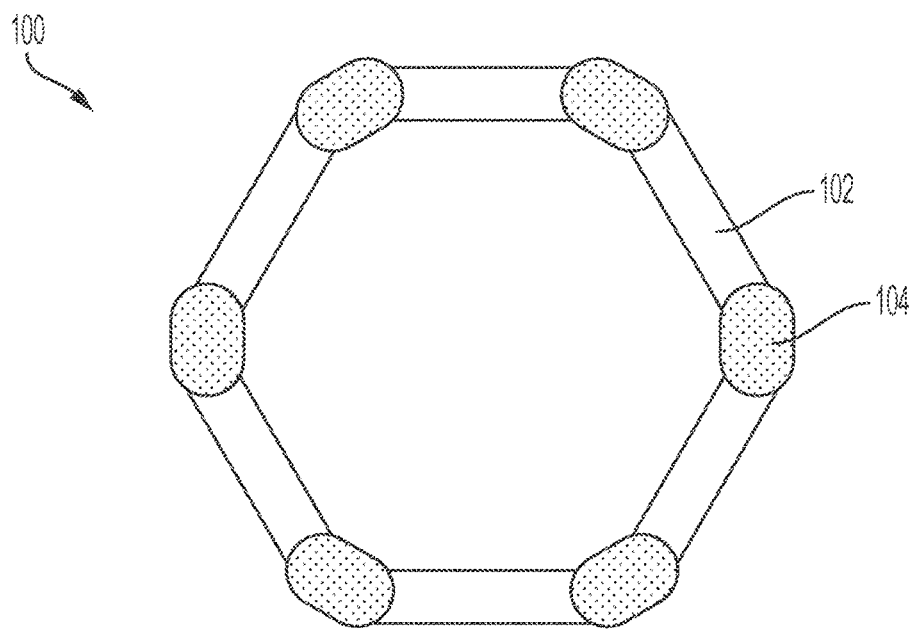
FIG. 1A shows a gastric residence system in an open configuration, according to some embodiments.

Described herein are capsules and capsule coatings for gastric residence systems. Provided also are methods of preparing gastric residence dosage forms using capsules and capsule coatings provided herein. As described above, gastric residence systems are designed to be administered to a patient when the gastric residence system is in a folded or collapsed configuration (i.e., to enable swallowing and easy passage of the drug delivery device to the patient's stomach). When the gastric residence system enters the patient's stomach, it unfolds to assume an open configuration. The physical opening or unfolding of the gastric residence system results in a dosage form with effective size (i.e., a gastric residence system in an open configuration) that is too large to pass through the patient's pyloric valve (i.e., opening between the stomach and the large intestine). The deployed, or expanded, gastric residence system can stay in the patient's stomach for a predetermined period of time (e.g., 24 hours, 48 hours, 7 days, 10 days, etc.).

However, one challenge in particular with gastric residence systems is controlling their opening/unfolding. A gastric residence system that unfolds too early (e.g., in a patient's esophagus) or too late (e.g., in a patient's intestine) is undesirable. A gastric residence system that fails to unfold at all may pass completely through a patient's gastrointestinal tract still in a folded configuration. In each of these hypothetical situations, the gastric residence system fails to properly deliver its therapeutic agent (e.g., active pharmaceutical ingredient) to the patient's stomach.

Accordingly, capsules and capsule coatings provided herein are designed to better control the deployment of gastric residence systems such that they effectively deliver the therapeutic agent to the patient's stomach. In particular, gastric residence dosage forms comprising a capsule and/or a capsule coating according to embodiments provided herein are more likely to unfold and to assume an open configuration at the desired location and at the desired time within a patient's body. For example, a gastric residence dosage form may be used to deliver a therapeutic agent to a patient's stomach. Thus, the particular capsule and/or capsule coating used to prepare the gastric residence dosage form can be specially formulated to ensure that the gastric residence system does not deploy too early (e.g., in a patient's esophagus), too late (e.g., in a patient's intestine), or not at all.

As used herein, "gastric residence system" is a dosage form comprising a therapeutic agent and is configured to be administered to a patient in a folded configuration. A "gastric residence dosage form" or "enrobed gastric residence dosage form" comprises a folded gastric residence system and is configured to hold the gastric residence system in a folded configuration until deployment. A gastric residence dosage form may comprise a capsule and/or a capsule coating according to embodiments described herein. Further, "deployment time" is defined as the amount of time it takes a gastric residence system to assume an open configuration.

In some embodiments, a capsule may include a sleeve or band configured to hold the gastric residence system in a folded configuration. A gastric residence system folded and retained in a folded configuration with a sleeve or band may be encapsulated by a capsule.

In some embodiments, an encapsulated gastric residence system may be coated with a capsule coating formulated to control the release of the gastric residence system. For example, an encapsulated gastric residence system may be coated with a reverse-enteric coating. A reverse-enteric coating can encourage dissolution of the capsule in a patient's stomach, ensuring that the capsule and capsule coating dissolve within the stomach such that the gastric residence system may be released to assume an open configuration. The reverse-enteric coating can also discourage dissolution of the capsule in a patient's esophagus and/or intestines, preventing premature and/or late release of the gastric residence system. In some embodiments, the coating may include a polymer. In some embodiments, the coating may include a plasticizer. In some embodiments, the coating may include an anti-tacking agent. In some embodiments, the coating may include a hydration agent.

Described below are general principles of gastric residence systems, as well as capsules and capsule coatings that can control the release of gastric residence systems.

General Principles of Gastric Residence Systems

Provided below is a description of gastric residence systems and how they operate to deliver a therapeutic agent to a patient. In particular, the discussion includes a general description of how gastric residence systems are designed to deliver a therapeutic agent to a patient over an extended period of time, how gastric residence systems are configured for administration, how gastric residence systems are configured to deploy and deliver a therapeutic agent to the stomach of a patient, how the therapeutic agent of a gastric residence system elutes from the device such that the therapeutic agent is delivered to the patient, how the gastric residence system passes through the stomach, and how gastric residence systems are designed to account for some specific safety measures.

Gastric residence dosage forms can be designed to be administered to the stomach of a patient by swallowing, by feeding tube, by gastric tube, etc. Once a gastric residence dosage form is in place in the stomach, it can remain in the stomach for a desired residence time (e.g., three days, seven days, two weeks, etc.). A gastric residence dosage form that is properly in place in a stomach will resist passage through the pyloric valve, which separates the stomach from the small intestine. Gastric residence dosage forms can release a therapeutic agent (i.e., API or drug) over the period of residence with controlled release. While residing in the stomach, the dosage form may not interfere with the normal passage of food or other gastric contents. Once the desired residence time has expired, the dosage form passes out of the stomach (i.e., through the pyloric valve) and is readily eliminated from the patient.

To administer a gastric residence system to a patient, the gastric residence system can be folded into a form small enough to be swallowed or otherwise administered. In some embodiments, the folded gastric residence system is retained in a capsule or other container which can be swallowed by the patient. In some cases, the gastric residence system may be delivered to a patient via gastrostomy tube, feeding tube, gastric tube, or other route of administration to the stomach. Examples of folding and encapsulating the gastric residence system are provided in further detail below.

Figure 1B:
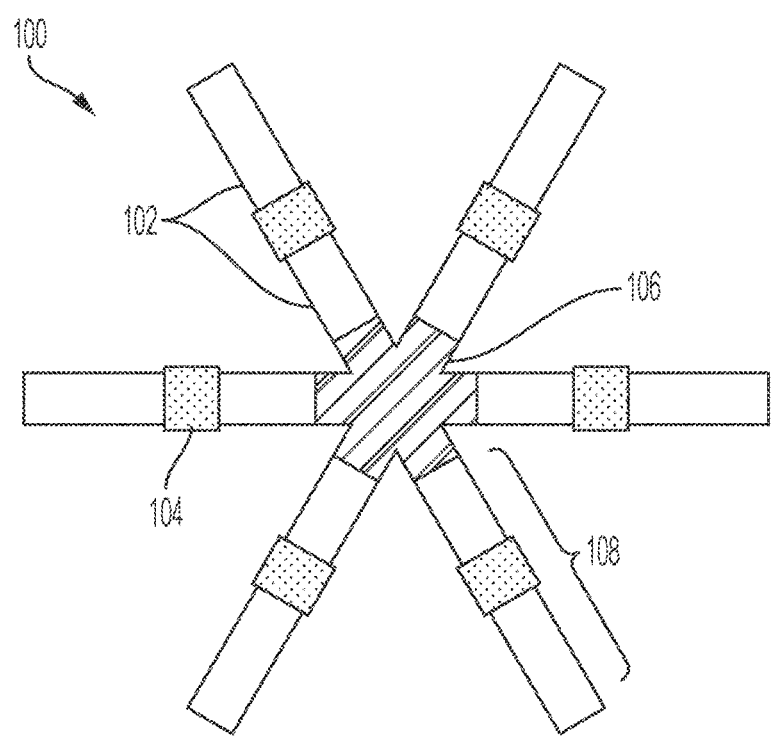
FIG. 1B shows a gastric residence system in an open configuration, according to some embodiments.
Figure 1C:
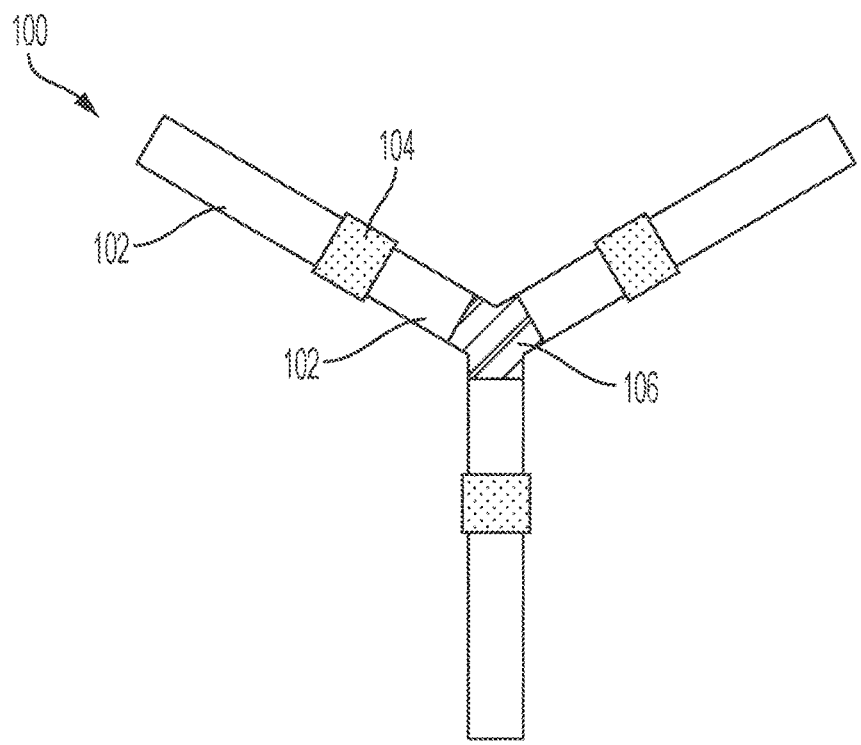
FIG. 1C shows a gastric residence system in an open configuration, according to some embodiments.

FIGS. 1A-1C provide embodiments of foldable or compactable gastric residence systems. Specifically, the foldable or compactable gastric residence systems shown in FIGS. 1A-1C are provided in an unfolded configuration.

For example, the ring-shaped design gastric residence system 100 shown in FIG. 1A can be twisted into a double helix. In particular, gastric residence system 100 includes carrier polymer-agent components 102 and couplings 104. In some embodiments, coupling 104 may comprise coupling polymer. In some embodiments, gastric residence system 100 can be folded at one or more coupling polymer joints 104, or twisted into a helix for packaging into a capsule in its folded configuration. Once the capsule dissolves in the stomach, gastric residence system 100 unfolds to the circular shape of its open, or unfolded, configuration, preventing passage through the pyloric valve.

As shown in FIG. 1B, gastric residence system 100 may also be star-shaped (stellate) according to some embodiments. In some embodiments, a star-shaped gastric residence system 100 is constructed around central elastomer 106. Central elastomer 106 may include one or more elongate member 108, or "arms," projecting radially. The arms may be formed by carrier polymer-agent components 102 and couplings 104 comprising coupling polymer. One or more polymer-agent component 102 and coupling 104 together comprise an "arm" of this "star-shaped" configuration. Elastomer 106 enables gastric residence system 100 to be folded for packaging into a capsule.

FIG. 1C shows gastric residence system 100 comprising three "arms" according to some embodiments. This configuration can also include central elastomer 106 from which the three "arms" radially extend. Each of the three arms comprise polymer-agent component 102 and coupling 104 as well.

Figure 2:
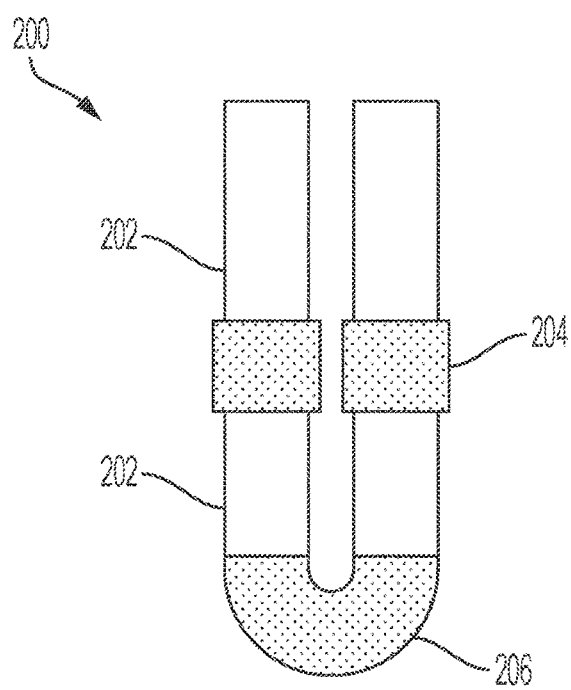
FIG. 2 shows a gastric residence system in a folded configuration, according to some embodiments.

FIG. 2 shows folded gastric residence system 200 according to some embodiments. As shown, the device can fold at central elastomer 206, bringing the ends of each "arm" together. The Figure also shows how the carrier polymer-agent components 102 and couplings 104 of each arm may be oriented in a folded configuration.

The folded configuration of gastric residence system 100 can be bound (i.e., held in a folded configuration) with a sleeve or band. In some embodiments, a gastric residence system in a folded configuration (with or without a sleeve or band) may be encapsulated with a capsule to form a gastric residence dosage form. In some embodiments, the gastric residence dosage form may be coated with a reverse-enteric coating to ensure deployment of the gastric residence system in a patient's stomach.

Once the gastric residence dosage form arrives in the stomach of the patient, the capsule and/or capsule coating of the gastric residence dosage form may dissolve/open and release the folded gastric residence system. Upon release, the gastric residence system unfolds to assume an open configuration, such as a ring shape or a star shape as provided in FIGS. 1A-1C. The dimensions of the open gastric residence system are suitable to prevent passage of the device through the pyloric valve for the period of time during which the device is to reside in the stomach. In some embodiments, the folded gastric residence system can also be secured by a dissolvable retaining band or sleeve that can prevent premature deployment of the gastric residence system in case of a failure of the capsule.

While in the stomach, the gastric residence system is compatible with digestion and other normal functioning of the stomach or gastrointestinal tract. The gastric residence system does not interfere with or impede the passage of chyme (partially digested food) or other gastric contents which exit the stomach through the pyloric valve into the duodenum.

Once released from the capsule into the stomach, the therapeutic agent of the gastric residence system begins to take effect. In some embodiments, the gastric residence system comprises a plurality of carrier polymer-agent components. The carrier polymer-agent components may comprise a carrier polymer, a dispersant, and a therapeutic agent (or a salt thereof). The plurality of carrier polymer-agent components are linked together by one or more coupling polymer components. The therapeutic agent may be eluted from the carrier polymer-agent components into the gastric fluid of the patient over the desired residence time of the system. Release of the therapeutic agent is controlled by appropriate formulation of the carrier polymer-agent components, including by the use of the dispersant in formulation of the carrier polymer-agent components, and by milling of the therapeutic agent to particles of desired size prior to blending the agent with the carrier polymer and dispersant.

In some embodiments, a gastric residence system may include a filament (or "webbing") between arms of a gastric residence system. Gastric residence systems having a filament may help improve the gastric residence of the gastric residence system. Specifically, a filament can help provide a more consistent gastric residence time and/or a longer gastric residence time. Thus, gastric residence systems that include a filament may provide more predictable and/or controllable gastric residence times. Gastric residence systems having predictable and/or controllable gastric residence times can minimize the possibility of the gastric residence system passing through the stomach and unfolding later in the gastrointestinal tract (i.e., intestine), or passing through the gastrointestinal tract without unfolding at all. In each of these possible scenarios, the therapeutic agent of the gastric residence dosage form is not delivered to the patient as intended.

In some embodiments, a filament wrapped circumferentially around a gastric residence system and connecting the arms of the gastric residence system, for example, can help prevent premature passage through a patient's gastric pylorus.

Additionally, coatings can be applied to outer surfaces of the gastric residence system. The coatings can include additional therapeutic agents or agents that can affect the release of therapeutic agents or the residence duration of the gastric residence system.

Once the desired residence time has expired, the gastric residence system passes out of the stomach. To do so, various components of the gastric delivery system are designed to weaken and degrade. The specific dimensions of the system are also taken into consideration. In its intact, open configuration, the gastric residence system is designed to resist passage through the pyloric valve. However, coupling polymer components of the gastric residence system are chosen such that they gradually degrade over the specified residence period in the stomach. When the coupling polymer components are sufficiently weakened by degradation, the gastric residence system loses critical resilience to compression or size reduction and can break apart into smaller pieces. The reduced-size dosage form and any smaller pieces are designed to pass through the pyloric valve. The system then passes through the intestines and is eliminated from the patient. In some embodiments, a gastric residence system may be made of soft material such that the gastric residence system can pass through a pyloric valve intact once the residence time expires without degrading into numerous smaller pieces.

There are some safety considerations to account for during the design and administration of the gastric residence system and the gastric residence dosage form. In particular, it is important that the gastric residence system remain in its folded configuration until it reaches the stomach. If the gastric residence system opens or unfolds prior to reaching the patient's stomach, the patient risks an esophageal obstruction. Similarly, if an intact gastric residence dosage form passes through the pyloric valve without opening and the gastric residence system expanding into its open configuration, there is a risk that it could do so in the patient's intestine, resulting in an intestinal obstruction. Accordingly, capsules and capsule coatings according to embodiments described herein have been designed to control the deployment of gastric residence systems for improved patient safety.

Examples of gastric residence systems may be found in PCT/US2018/051816. WO 2015/191920, WO 2017/070612, WO 2017/100367, WO 2018/064630, WO 2017/205844, WO 2018/227147, and U.S. 62/933,211, each of which is incorporated herein in its entirety.

Capsules for Gastric Residence Systems

Following is a description of capsules for gastric residence systems, including both sleeves (or bands) and capsules (e.g., hard-shell capsules). In particular, sleeves/bands as described below may be used to hold a gastric residence system in a folded configuration. Capsules may be used to encapsulate the gastric residence system (with or without a sleeve) and control when the gastric residence system is released in a patient's stomach.

Capsules have been developed according to embodiments provided herein to enhance gastric residence system performance. Specifically, capsules have been developed to retain a gastric residence system in a folded configuration between the time of administration and the time it reaches the stomach. Once the gastric residence dosage form reaches the stomach, the capsule is configured to open and/or dissolve rapidly. A rapidly-opening or rapidly-dissolving capsule can ensure that the gastric residence system is released within the stomach before passing through the pyloric valve.

Sleeve for Mechanically Holding the Gastric Device in a Folded Configuration

In some embodiments, gastric residence dosage forms described herein may include a "sleeve" or "band". A sleeve or band may bind a gastric residence system into a folded configuration. When used together with a capsule, a sleeve may reduce outward pressure on the capsule. This can reduce any risk of capsule failure and premature deployment of the gastric residence system. Moreover, a sleeve provides a second retaining layer (when used together with a capsule) that must also lose the ability for to keep the dosage form in its folded state, and thereby reduces the potential for premature break down upon administration but prior to gastric localization. Thus, in the event of capsule failure, the sleeve provides a second layer of protection against premature deployment of the gastric residence system.

Figure 3A:
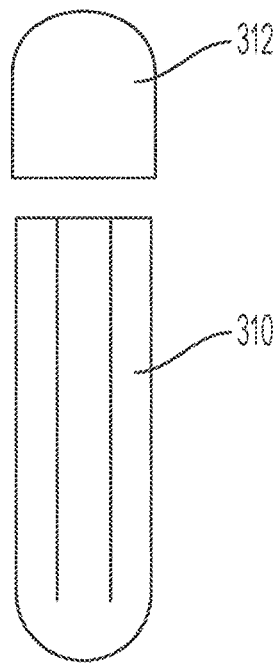
FIG. 3A shows a folded gastric residence system and a sleeve, according to some embodiments.
Figure 3B:
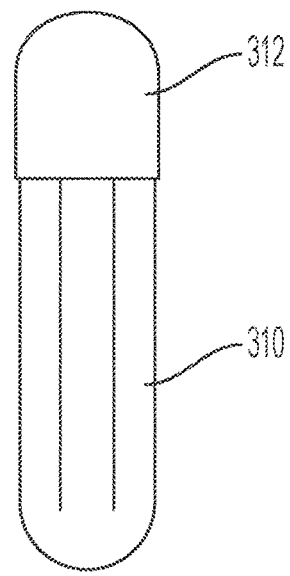
FIG. 3B shows a sleeved gastric residence system, according to some embodiments.

FIG. 3B shows compacted/folded gastric residence system 310 bound by sleeve 312 according to some embodiments. As shown, gastric residence system 310, in its folded configuration, is capped off at the arm end by sleeve 312.

FIG. 4B shows a compacted/folded gastric residence system 410 bound by sleeve 412 according to some embodiments. Unlike sleeve 312 of FIG. 3B, sleeve 412 of FIG. 4B includes two open ends. Thus, compacted/folded gastric residence system 410 passes through sleeve 412 such that gastric residence system 410 is exposed at both open ends of sleeve 412. Like that of FIG. 3B, gastric residence system 410 is bound by sleeve 412 at the arm end of gastric residence system 410.

In some embodiments, a sleeve may be gelatin-based. In some embodiments, a sleeve may be hydroxypropyl methylcellulose (HPMC)-based or pullulan-based. Other suitable materials (e.g., carrageenan, starch, cellulose, etc.) may also be included in the sleeves. For example, suitable sleeves can include VCaps® HPMC, VCaps® Plus HPMC, Plantcaps®, or ConiSnap®.

In some embodiments, the sleeve size and/or thickness may be optimized to control deployment time of a gastric residence system. For example, a sleeve having a thinner shell thickness may be used to release the gastric residence system faster. In some embodiments, a sleeve having a thicker shell thickness may be used to release the gastric residence system slower. In some embodiments, a sleeve having a smaller length and/or width may be used to control the release of a gastric residence system from the gastric residence dosage form. In some embodiments, a sleeve having a larger length and/or width may be used to control the release of a gastric residence system from the gastric residence dosage form. For example, a sleeve having a larger length/width may help delay the release of a gastric residence system. In some embodiments, a sleeve having a shorter length/width may be used to speed the release of a gastric residence system. In some embodiments, the placement of the sleeve on a folded gastric residence system may also be optimized to control deployment time. For example, the position of the sleeve may be optimized with respect to the folding force and/or with respect to the positioning of the body and/or cap of the capsule.

Additionally, some embodiments may include a wicking material between the sleeve and a folded gastric residence system. A wicking material may help a gastric residence system deploy faster. In some embodiments, the wicking material may comprise a hydrophilic polymer, a hygroscopic polymer, a hygroscopic wetting agent, and/or a humectant. Polymeric examples may include polysaccharide-based polymers such as hydroxypropyl methylcellulose, carboxymethylcellulose, starch, pectin, chitosan, alginate, other natural or semi-synthetic polymers like gelatin collagen, silk fibroin, and/or non-cellulosic synthetic polymers like polyethylene glycol, polyethyl glycol-polypropylene glycol di- and tri-block copolymers, polyvinylpyrrolidone, and derivatives thereof. Non-polymeric wicking materials may include wetting agents and humectants including polysorbates, glycerol, propanediol, sugars such as sucrose, glucose, dextrose, mannitol, maltitol, mannose and various salts.

Capsule for Encapsulating a Gastric Residence System

In addition to a "sleeve" or "band", as described above and provided in FIGS. 2 and 3, a capsule may also be used to retain the gastric residence system in a folded configuration until the dosage form reaches the stomach. A capsule may be used in addition to, or in lieu of, a sleeve.

Capsules can offer various advantages that include protection, blinding capabilities, and good coating adherence. For example, a capsule provides resistance to physical impact and external environmental factors (e.g., humidity). This layer of protection can improve the shelf-life of the gastric resident dosage form and protect it during transport. Additionally, capsules are opaque to allow for blinding (i.e., for use in clinical studies). Further, the capsules offer a suitable surface for capsule coatings (described in detail below). Capsule coatings according to embodiments provided herein suitably adhere to the surface of capsules.

As described above, capsules and/or sleeves according to embodiments provided herein are designed to protect a patient against esophageal deployment. For example, the deployment time of a capsule and/or sleeve in a pH 7.0 environment (i.e., the approximate pH of the esophagus) may be from 5 to 180 minutes, from 20 to 120 minutes, or from 20 to 60 minutes. In some embodiments, the deployment time of a capsule and/or sleeve in an aqueous pH 7.0 environment may be less than 180 minutes, less than 160 minutes, less than 140 minutes, less than 120 minutes, less than 100 minutes, less than 80 minutes, less than 60 minutes, less than 50 minutes, less than 40 minutes, less than 30 minutes, less than 25 minutes, or less than 20 minutes. In some embodiments, the deployment time of a capsule and/or sleeve in an aqueous pH 7.0 environment may be more than 15 minutes, more than 20 minutes, more than 25 minutes, more than 30 minutes, more than 40 minutes, more than 50 minutes, more than 60 minutes, more than 80 minutes, more than 100 minutes, more than 120 minutes, more than 140 minutes, or more than 160 minutes.

Capsules and/or sleeves according to embodiments provided herein can also be designed to rapidly dissolve and/or open in a gastric environment. As described above, once a gastric residence dosage form has reached the stomach, it should dissolve and/or open rapidly to allow the gastric residence system to release and unfold in the stomach. If the capsule and/or sleeve fails to dissolve/open rapidly, then the gastric residence dosage form risks passing through the pyloric valve prior to releasing the gastric residence system. Accordingly, capsules and/or sleeves according to embodiments provided herein are designed to dissolve/open rapidly and consistently. In some embodiments, the dissolution/opening of the capsule and/or sleeve has little or no reliance on a low pH.

Additionally, encapsulating gastric residence systems with capsules according to embodiments provided herein allows for a slippery, non-adhesive surface for ease of swallowing (to prevent esophageal holdups) and a non-tacky and defect-free processing, storage, and shipment phases.

In some embodiments, the capsules may be gelatin-based. In some embodiments, the capsules and/or sleeves may be hydroxypropyl methylcellulose (HPMC)-based or pullulan-based. Other suitable materials (e.g., carrageenan, starch, cellulose, etc.) may also be included in the capsules and/or sleeves. For example, suitable capsules can include VCaps® HPMC, VCaps® Plus HPMC, Plantcaps®, or Coni-Snap®.

In some embodiments, in addition to the coating described in detail below, the capsule size and/or thickness may be optimized to control deployment time of a gastric residence system. For example, a capsule having a thinner shell thickness may be used to release the gastric residence system faster. In some embodiments, a capsule having a thicker shell thickness may be used to release the gastric residence system slower. In some embodiments, a capsule having a smaller length and/or width may be used to control the release of a gastric residence system from the gastric residence dosage form. In some embodiments, a capsule having a larger length and/or width may be used to control the release of a gastric residence system from the gastric residence dosage form. For example, a capsule having a larger length/width may help delay the release of a gastric residence system. In some embodiments, a capsule having a shorter length/width may be used to speed the release of a gastric residence system.

A folded gastric residence system (bound with a sleeve or unbound) may be inserted into a two-piece capsule using any suitable encapsulation technique. For example, a gastric residence system may be manually folded and encapsulated. In some embodiments, the sleeve may be a size 0 or 0EL capsule cap. Once bound by the sleeve, the gastric residence system may be encapsulated with the sleeved end of the gastric residence system in the body of the two-piece capsule. If a 0 or 0EL capsule cap is used to sleeve the gastric residence system, for example, a slightly larger capsule (e.g., a size 00EL capsule) may be used to encapsulate the sleeved gastric residence system. In some embodiments, a folded gastric residence system may be encapsulated without a sleeve.

Figure 3C:
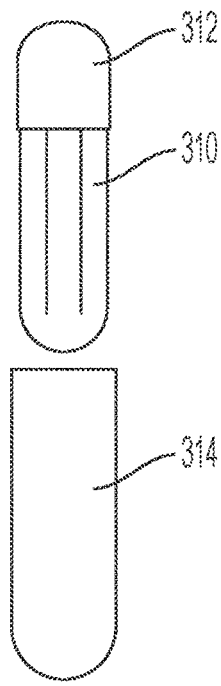
FIG. 3C shows a sleeved gastric residence system and a body portion of a two-piece capsule, according to some embodiments.
Figure 3D:
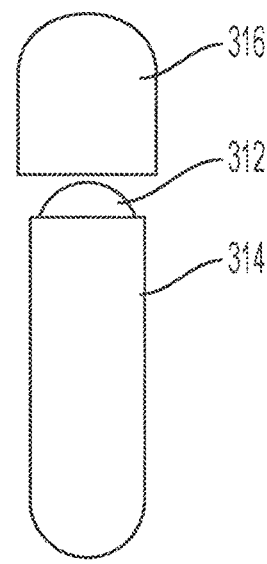
FIG. 3D shows a sleeved gastric residence system placed inside a body portion of a two-piece capsule, and a cap portion of a two-piece capsule, according to some embodiments.

FIGS. 3A-3D and FIG. 4A-4D show the steps of encapsulation according to some embodiments. Sleeve 312 of FIGS. 3A-3D is a full cap that fits on one end of folded gastric residence system 310. Sleeve 412 of FIGS. 4A-4D has a cylindrical shape with an open top and an open bottom. In particular, FIG. 3A shows a folded gastric residence system 310 with sleeve 312. FIG. 3B shows sleeve 312 binding gastric residence system 310 in a folded configuration. FIG. 3C shows gastric residence system 310 including sleeve 312 being inserted into body 314 of a two-piece capsule. FIG. 3D shows body 314 including the sleeve 312 and gastric residence system being capped off with cap 316 of the two-piece capsule.

Similarly, FIG. 4A shows a folded gastric residence system 410 with sleeve 412. FIG. 4B shows sleeve 412 binding gastric residence system 410 in a folded configuration. FIG. 4C shows gastric residence system 410 including sleeve 412 being inserted into body 414 of a two-piece capsule. FIG. 4D shows the body 414 including the sleeved gastric residence system 410 being capped off with cap 416 of the two-piece capsule.

Additionally, the configuration of the sleeve and/or the two-piece capsule can vary depending on the gastric residence dosage form. In some embodiments, the placement of the sleeve and/or the two-piece capsule relative to the core side and the arm side of the gastric residence system may have an impact on the deployment time of the gastric residence system.

Figure 5C:
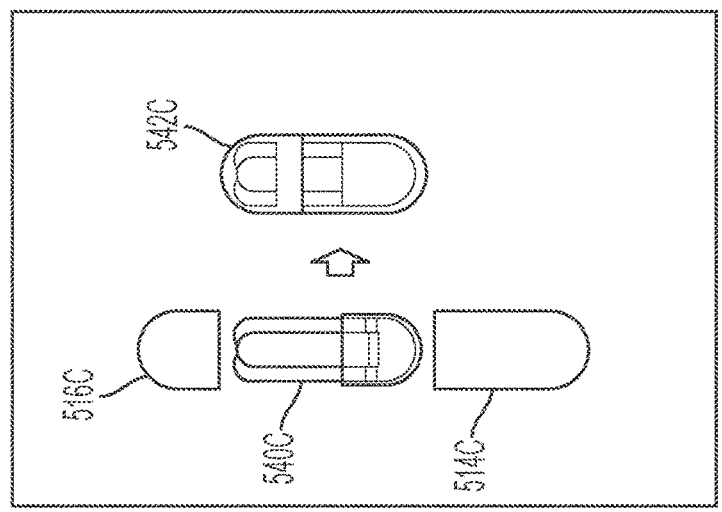
FIG. 5C shows an encapsulated and sleeved folded gastric residence system, according to some embodiments.
Figure 5B:
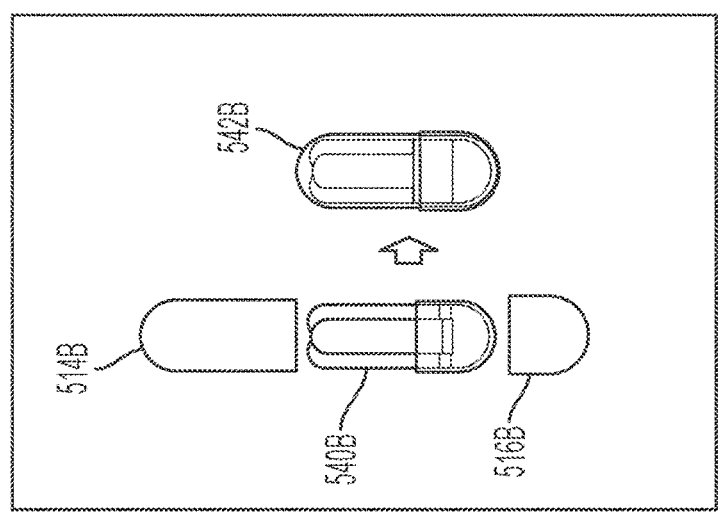
FIG. 5B shows an encapsulated and sleeved folded gastric residence system, according to some embodiments.
Figure 5A:
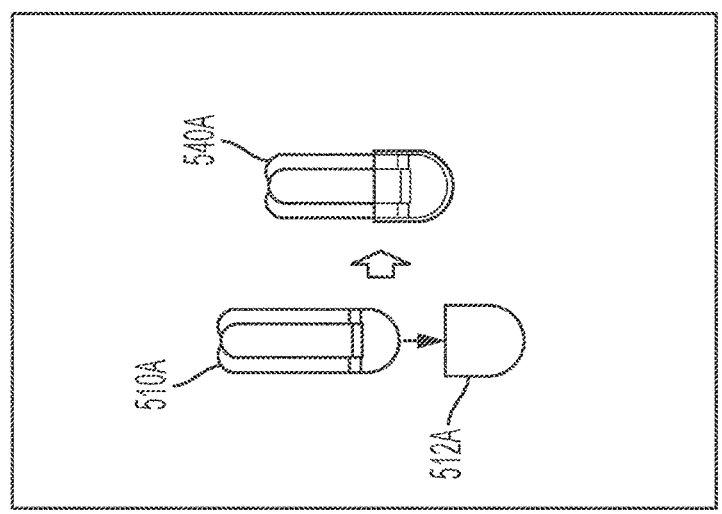
FIG. 5A shows a folded gastric residence system sleeved on a core side, according to some embodiments.

FIGS. 5A-5C show a few different configurations for sleeve and two-piece capsule placement. Specifically, FIG. 5A shows a compacted/folded gastric residence system 510A. As shown, gastric residence system 510A can be sleeved by capsule sleeve 512A. FIG. 5A shows gastric residence system 510A sleeved on the core side of the folded gastric residence system 510A. However, gastric residence system 510A may be sleeved on an arm side in some embodiments. In the figure, the core side of gastric residence system 510A is shaded. The opposing side of compacted/folded gastric residence system 510A is the arm side, where the arms converge when the gastric residence system is folded. Once the sleeve 512A is placed on the compacted/folded gastric residence system 510A, a sleeved compacted/folded gastric residence system 540A is formed.

FIG. 5B shows a sleeved compacted/folded gastric residence system 540B being encapsulated with a two-piece capsule. In the figure, sleeved compacted/folded gastric residence system 540B is sleeved on the core side of the gastric residence system, like that of sleeved compacted/folded gastric residence system 540A of FIG. 5A. Cap 516B of the two-piece capsule is placed over the sleeve of sleeved compacted/folded gastric residence system 540B (i.e., on the core side of the gastric residence system). Body 514B of the two-piece capsule is placed over the arm side of the compacted/folded gastric residence system. When both cap 516B and body 514B (i.e., both pieces of the two-piece capsule) are placed on sleeved compacted/folded gastric residence system 540B, encapsulated gastric residence dosage form 542 is formed. Additionally, cap 516B and body 514B may overlap to an extent to form a seal protecting encapsulated gastric residence dosage form 542B from the exterior environment.

FIG. 5C also shows a sleeved compacted/folded gastric residence system 540C encapsulated with a two-piece capsule. However, unlike sleeved compacted/folded gastric residence system 540B of FIG. 5B, sleeved compacted/folded gastric residence system 540C is encapsulated with a two-piece capsule such that the body of the two-piece capsule, body 514C, encases the sleeve of sleeved compacted/folded gastric residence system 540C. The cap of the two-piece capsule, cap 516C, is placed over the arm side of the compacted/folded gastric residence system. Cap 516C and body 514C may overlap to an extent to form a seal protecting encapsulated gastric residence dosage form 542B from the exterior environment.

Capsule Coatings for Gastric Residence Dosage Forms

Following is a description of capsule coatings for gastric residence systems. In particular, capsule coatings described below may be used to delay capsule dissolution/opening when the gastric residence dosage form is in the esophagus.

In some embodiments, capsule coatings described below may speed up capsule opening when the gastric residence dosage form is in the stomach. As described below, capsule coatings may provide a protective moisture barrier, encourage gastric dissolution, encourage passage through the esophagus, and provide a more pleasant administration experience for the patient.

In some embodiments, capsules described herein may be coated with a reverse-enteric low-friction static coefficient polymer. A reverse-enteric low-friction static coefficient polymer coating may help encourage passage of the coated capsule through the esophagus, minimizing the risk of pill esophagitis. Specifically, the presence of a reverse-enteric polymer and/or magnesium stearate in the coating may lower the static coefficient of friction of the dosage form. Some specific drugs/APIs in particular have a tendency to cause esophagitis such as doxycycline, tetracycline, clindamycin, other antibiotics, potassium chloride, bisphosphonates, and non-steroidal anti-inflammatory drugs. Some of these APIs can pose a health risk if they cause esophagitis. Thus, ensuring that they pass easily through the esophagus can help prevent esophagitis.

In some embodiments, the reverse-enteric low-friction static coefficient polymer coating may be applied to the exterior surface of a dosage form. For example, a suitable dosage form may include a tablet, a capsule, or an enrobed gastric residence system. In some embodiments, a coated dosage form may comprise a gastric residence system with an API. In some embodiments, a coated dosage form may comprise an API with no gastric residence system.

In some embodiments, the static coefficient of friction of a dosage form coated with a reverse-enteric low-friction static coefficient polymer coating may be less than that of an uncoated dosage form. In some embodiments, the static coefficient of friction of a coated dosage form may be from 0.02 to 0.3 or from 0.05 to 0.2. In some embodiments, the static coefficient of friction of a coated dosage form may be less than 0.3, less than 0.25, less than 0.2, less than 0.15, less than 0.1, or less than 0.05. In some embodiments, the static coefficient of friction of a coated dosage form may be more than 0.02, more than 0.05, more than 0.1, more than 0.15, more than 0.2, or more than 0.25.

In some embodiments, $$\frac{\text{static coefficient of friction of coated dosage form}}{\text{static coefficient of friction of uncoated dosage form}}$$

may be 0.2-0.8. In some embodiments, $$\frac{\text{static coefficient of friction of coated dosage form}}{\text{static coefficient of friction of uncoated dosage form}}$$

may be less than 0.8, less than 0.7, less than 0.6, less than 0.5, less than 0.4, or less than 0.3. In some embodiments, $$\frac{\text{static coefficient of friction of coated dosage form}}{\text{static coefficient of friction of uncoated dosage form}}$$

may be more than 0.2, more than 0.3, more than 0.4, more than 0.5, more than 0.6, or more than 0.7.

In some embodiments, the static coefficient of friction of a coated dosage form may be from 5-80%, from 20-80%, or from 50-80% that of an uncoated dosage form. In some embodiments, the static coefficient of friction of a coated dosage form may be less than 80%, less than 70%, less than 600, less than 500%, less than 40%, less than 30%, less than 20%, or less than 100% that of an uncoated dosage form. In some embodiments, the static coefficient of friction of a coated dosage form may be more than 5%, more than 10%, more than 20%, more than 30%, more than 40%, more than 50%, more than 60%, or more than 70% that of an uncoated dosage form. In some embodiments, the static coefficient of friction of a coated dosage form may be from 0.05 to 0.35, or from 0.1 to 0.2 less than that of an uncoated dosage form. In some embodiments, the static coefficient of friction of a coated dosage form may be less than 0.35, less than 0.3, less than 0.25, less than 0.2, less than 0.15, or less than 0.1, or less than 0.08 less than that of an uncoated dosage form. In some embodiments, the static coefficient of friction of a coated dosage form may be more than 0.05, more than 0.08, more than 0.1, more than 0.15, more than 0.2, more than 0.25, or more than 0.3 less than that of an uncoated dosage form.

For example, gastric residence dosage forms comprising a coated capsule may release a gastric residence system and allow the gastric residence system to assume an open configuration in a first amount of time when exposed to an aqueous pH 7.0 environment (i.e., esophageal environment). In some embodiments, uncoated gastric residence dosage forms comprising an uncoated capsule may release a gastric residence system and allow the gastric residence system to assume an open configuration in a second amount of time when exposed to an aqueous pH 7.0 environment. In some embodiments, the first amount of time is greater than the second amount of time. In some embodiments, the first amount of time may be from 15 seconds to 20 minutes, from 1 minute to 15 minutes, or from 1 minute to 10 minutes greater than the second amount of time. In some embodiments, the first amount of time may be more than 15 seconds, more than 30 seconds, more than 45 seconds, more than 1 minute, more than 3 minutes, more than 5 minutes, more than 8 minutes, more than 10 minutes, more than 12 minutes, or more than 15 minutes greater than the second amount of time. In some embodiments, the first amount of time may be less than 20 minutes, less than 18 minutes, less than 15 minutes, less than 12 minutes, less than 10 minutes, less than 8 minutes, less than 5 minutes, less than 3 minutes, less than 1 minute, less than 45 seconds, or less than 30 seconds greater than the second amount of time. Gastric residence dosage forms comprising a coated capsule and uncoated gastric residence dosage forms comprising an uncoated capsule may have the same compositional properties (e.g., compositional properties of the capsule, compositional properties of the gastric residence system, compositional properties of the sleeve, if present) except for the coating. As described above, gastric residence dosage forms comprising a coated capsule have a capsule coating according to embodiments provided herein. Uncoated gastric residence dosage forms comprising an uncoated capsule have no capsule coating.

In some embodiments, gastric residence dosage forms comprising a coated capsule may release a gastric residence system and allow the gastric residence system to assume an open configuration in a third amount of time when exposed to an aqueous pH 3.0 environment (i.e., gastric environment). In some embodiments, uncoated gastric residence dosage forms comprising an uncoated capsule may release a gastric residence system and allow the gastric residence system to assume an open configuration in a fourth amount of time when exposed to an aqueous pH 3.0 environment. In some embodiments, the third amount of time is greater than the fourth amount of time. In some embodiments, the third amount of time may be from 15 seconds to 20 minutes, from 1 minute to 15 minutes, or from 1 minute to 10 minutes greater than the fourth amount of time. In some embodiments, the third amount of time may be more than 15 seconds, more than 30 seconds, more than 45 seconds, more than 1 minute, more than 3 minutes, more than 5 minutes, more than 8 minutes, more than 10 minutes, more than 12 minutes, or more than 15 minutes greater than the fourth amount of time. In some embodiments, the third amount of time may be less than 20 minutes, less than 18 minutes, less than 15 minutes, less than 12 minutes, less than 10 minutes, less than 8 minutes, less than 5 minutes, less than 3 minutes, less than 1 minute, less than 45 seconds, or less than 30 seconds greater than the fourth amount of time. Gastric residence dosage forms comprising a coated capsule and uncoated gastric residence dosage forms comprising an uncoated capsule may have the same compositional properties (e.g., compositional properties of the capsule, compositional properties of the gastric residence system, compositional properties of the sleeve, if present) except for the coating. As described above, gastric residence dosage forms comprising a coated capsule have a capsule coating according to embodiments provided herein. Uncoated gastric residence dosage forms comprising an uncoated capsule have no capsule coating.

Capsule coating compositions provided herein may delay the time at which the gastric residence dosage form releases a gastric residence system and allows it to assume an open configuration to help prevent premature deployment in a patient's esophagus (i.e., pH 7.0). For example, a coated gastric residence dosage form may release a gastric residence system and allow it to assume an open configuration after residing in an aqueous pH 7.0 environment from 20 to 120 minutes, from 30 to 90 minutes, or from 40 to 60 minutes. In some embodiments, a coated gastric residence dosage form may release a gastric residence system and allow it to assume an open configuration after residing in an aqueous pH 7.0 environment for less than 120 minutes, less than 100 minutes, less than 80 minutes, less than 60 minutes, less than 50 minutes, less than 40 minutes, or less than 30 minutes. In some embodiments, a coated gastric residence dosage form may release a gastric residence system and allow it to assume an open configuration after residing in an aqueous pH 7.0 environment for more than 20 minutes, more than 30 minutes, more than 40 minutes, more than 50 minutes, more than 60 minutes, more than 80 minutes, or more than 100 minutes. The time at which it takes a coated gastric residence dosage form to open in an esophagus may be longer than the amount of time it takes the coated gastric residence dosage form to pass from a patient's mouth, through the patient's esophagus, and to the patient's stomach.

Capsule coatings as provided herein have also been developed to encourage rapid dissolution/opening of the capsule and thus, release of the gastric residence system encapsulated within. As discussed above, rapid opening of the capsule and release of the gastric residence system in the stomach (e.g., pH 1.5-3.0) can help prevent a gastric residence dosage form from passing through the pyloric valve unopened. However, in some embodiments, a coated gastric residence dosage form may release a gastric residence system and allow it to assume an open configuration after residing in an aqueous pH 3.0 environment from 10 seconds to 30 minutes, from 30 seconds to 20 minutes, or from 1 minute to 10 minutes. In some embodiments, a coated gastric residence dosage form may release a gastric residence system and allow it to assume an open configuration after residing in an aqueous pH 3.0 environment for more than 10 seconds, more than 20 seconds, more than 30 seconds, more than 40 seconds, more than 50 seconds, more than 1 minute, more than 2 minutes, more than 3 minutes, more than 4 minutes, more than 5 minutes, more than 10 minutes, more than 15 minutes, more than 20 minutes, or more than 25 minutes. In some embodiments, a coated gastric residence dosage form may release a gastric residence system and allow it to assume an open configuration after residing in an aqueous pH 3.0 environment for less than 30 minutes, less than 25 minutes, less than 20 minutes, less than 15 minutes, less than 10 minutes, less than 5 minutes, less than 4 minutes, less than 3 minutes, less than 2 minutes, less than 1 minute, less than 50 seconds, less than 40 seconds, less than 30 seconds, or less than 20 seconds.

Capsule coatings according to embodiments provided herein may include a polymer, a plasticizer, an anti-tacking agent, and/or a hydration aid.

In some embodiments, the polymer may be a reverse-enteric polymer. A reverse-enteric polymer can encourage dissolution of the capsule in a gastric environment (e.g., pH 1.5-3.0). A reverse-enteric polymer can also provide a moisture barrier to the capsule. A suitable reverse-enteric polymer may have desirable physiochemical dissolution properties, have good film-forming capacity, and be suitable for pharmaceutical coating methods (e.g., pan-coating). In some embodiments, polymethacrylates are suitable reverse-enteric polymers. For example, Eudragit® polymers may be suitable in some embodiments. Eudragit® polymers include a diverse range of polymethacrylate-based copolymers specifically formulated to aid in targeted drug release. In some embodiments, Eudragit® E may be a suitable reverse-enteric polymer. In particular, Eudragit® E dissolves in gastric fluid by the salt formation of its tertiary amine group in pH environments below 5.0. Thus, Eudragit® E can provide a suitable moisture barrier at neutral pH environments (i.e., in the mouth and esophagus), but is readily soluble in acidic pH environments (i.e., in the stomach). However, other materials may also be suitable as a reverse-enteric polymer, such as those that ionize and/or solubilize in acidic environments to provide an enhanced rate of moisture permeation (i.e., access to the underlying capsule or coating layers). However, pH dependence is not a requirement of the polymer itself, but may be achieved with the addition of other excipients in the coating formulation. For example, the coating formulation may include small molecule additives with enhanced solubility at reduced pH (e.g., tertiary amine, imidazole-containing chemical entities, etc.). In some embodiments, a dry capsule coating composition on a capsule may include from 40 to 95 wt. %, from 50 to 80 wt. %, or from 60 to 70 wt. % polymer to total solids. In some embodiments, a dry capsule coating composition on a capsule may include less than 95 wt. %, less than 90 wt. %, less than 85 wt. %, less than 80 wt. %, less than 75 wt. %, less than 70 wt %, less than 65 wt. %, less than 60 wt. %, less than 55 wt. %, less than 50 wt. %, or less than 45 wt. % polymer to total solids. In some embodiments, a dry capsule coating composition on a capsule may include more than 40 wt. %, more than 45 wt. %, more than 50 wt. %, more than 55 wt. %, more than 60 wt. %, more than 65 wt. %, more than 70 wt. %, more than 75 wt. % polymer, more than 80 wt. % more than 85 wt. %, or more than 90 wt. % polymer to total solids.

In some embodiments, a liquid capsule coating composition (i.e., in solution, prior to drying on the surface of a capsule) may include from 3 to 30 wt. % polymer, from 5 to 25 wt. % polymer, or from 5 to 20 wt. % polymer. In some embodiments, a liquid capsule coating composition may include more than 3 wt. %, more than 5 wt. %, more than 8 wt. %, more than 10 wt. %, more than 12 wt. %, more than 15 wt. %, more than 18 wt. %, more than 20 wt. %, or more than 25 wt. % polymer. In some embodiments, a liquid capsule coating composition may include less than 30 wt. %, less than 28 wt. %, less than 25 wt. %, less than 23 wt. %, less than 20 wt. %, less than 18 wt. %, less than 15 wt. %, less than 12 wt. %, less than 10 wt %, less than 8 wt. %, or less than 5 wt. % polymer.

Plasticizers in the coating formulation may reduce brittleness by enhancing the flexibility, resilience, and adhesion of the coating to the underlying capsule surface. Suitable plasticizers may include phthalates, phosphates, citrates, tartrates, adipates, sebacates, sulfonamides, succinates, glycolates, glycerolates, benzoates, myristates, halogenated phenyls, and poloxamers. Specific compounds that may be used as a plasticizer in the coating formulation can include triacetin, triethyl citrate, polyethylene glycol, and dibutyl sebacate. In some embodiments, a dry capsule coating composition on a capsule may include from 1 to 30 wt. %, from 1 to 20 wt. %, or from 1 to 10 wt. % plasticizer to total solids. In some embodiments, a dry capsule coating composition on a capsule may include less than 30 wt. % less than 25 wt. %, less than 20 wt. %, less than 15 wt. %, less than 10 wt %, less than 9 wt. %, less than 8 wt. %, less than 7 wt. %, less than 6 wt. %, less than 5 wt. %, less than 4 wt. %, less than 3 wt. %, or less than 2 wt. % plasticizer to total solids. In some embodiments, a dry capsule coating composition on a capsule may include more than 1 wt. %, more than 2 wt. %, more than 3 wt. %, more than 4 wt. %, more than 5 wt. %, more than 6 wt. %, more than 7 wt. %, more than 8 wt. %, more than 9 wt. %, more than 10 wt. %, more than 15 wt. %, more than 20 wt. %, or more than 25 wt. % plasticizer to total solids.

In some embodiments, a liquid capsule coating composition (i.e., in solution, prior to drying on the surface of a capsule) may include from 0.1 to 5.0 wt. %, from 0.2 to 3.0 wt. %, or from 0.3 to 1.0 wt. % plasticizer. In some embodiments, a liquid capsule coating composition may include more than 0.1 wt. %, more than 0.2 wt. %, more than 0.3 wt. %, more than 0.4 wt. %, more than 0.5 wt. %, more than 0.6 wt. %, more than 0.7 wt. %, more than 0.8 wt. %, more than 0.9 wt. %, more than 1.0 wt. %, more than 1.5 wt. %, more than 2.0 wt. %, more than 2.5 wt. %, more than 3.0 wt. %, or more than 4.0 wt. % plasticizer. In some embodiments, a liquid capsule coating composition may include less than 5.0 wt. %, less than 4.0 wt. %, less than 3.5 wt. %, less than 3.0 wt. %, less than 2.5 wt. %, less than 2.0 wt. %, 1.5 wt. %, less than 1.0 wt %, less than 0.9 wt. %, less than 0.8 wt. %, less than 0.7 wt. %, less than 0.6 wt. %, less than 0.5 wt. %, less than 0.4 wt. %, less than 0.3 wt. %, or less than 0.2 wt % plasticizer.

An anti-tacking agent in the capsule coating formulation may help prevent capsule tackiness during process and storage. Additionally, certain anti-tacking agents may improve the lubricity of the coated capsules and provide a glossy and smooth surface finish. Suitable anti-tacking agents may include bulk-acting agents (e.g., talc) and surface-acting agents (e.g., magnesium stearate). In some embodiments, magnesium stearate in particular may help decrease the static coefficient of friction of a coated encapsulated gastric residence system. In some embodiments, a coating comprising magnesium stearate may be able to lower the static coefficient of friction to less than 0.1, or such that $$\frac{\text{static coefficient of friction of coated dosage form}}{\text{static coefficient of friction of uncoated dosage form}}$$

is than or equal to 0.4. A coated encapsulated gastric residence system having a decreased static coefficient of friction can help the dosage form pass through a patient's esophagus and minimize the possibility of pill esophagitis. In some embodiments, a dry capsule coating composition on a capsule may include from 1 to 40 wt. %, from 1 to 25 wt. %, or from 1 to 10 wt. % anti-tacking agent to total solids. In some embodiments, a dry capsule coating composition on a capsule may include less than 40 wt. %, less than 35 wt. %, less than 30 wt. %, less than 25 wt. %, less than 20 wt. %, less than 15 wt. %, less than 10 wt. %, less than 9 wt. %, less than 8 wt. %, less than 7 wt %, less than 6 wt. %, less than 5 wt. %, less than 4 wt. %, less than 3 wt. %, or less than 2 wt. % anti-tacking agent to total solids. In some embodiments, a dry capsule coating composition on a capsule may include more than 1 wt. %, more than 2 wt. %, more than 3 wt. %, more than 4 wt. %, more than 5 wt. %, more than 6 wt. %, more than 7 wt. %, more than 8 wt. %, more than 9 wt. %, more than 10 wt. %, more than 15 wt. %, more than 20 wt. %, more than 25 wt. %, more than 30 wt. %, or more than 35 wt. % anti-tacking agent to total solids.

In some embodiments, a liquid capsule coating composition (i.e., in solution, prior to drying on the surface of a capsule) may include from 0.1 to 5.0 wt. %, from 0.2 to 3.0 wt. %, or from 0.3 to 1.0 wt. % anti-tacking agent. In some embodiments, a liquid capsule coating composition may include more than 0.1 wt. %, more than 0.2 wt. %, more than 0.3 wt. %, more than 0.4 wt. %, more than 0.5 wt. %, more than 0.6 wt. %, more than 0.7 wt. %, more than 0.8 wt. %, more than 0.9 wt. %, more than 1.0 wt. %, more than 1.5 wt. %, more than 2.0 wt. %, more than 2.5 wt %, more than 3.0 wt. %, or more than 4.0 wt. % anti-tacking agent. In some embodiments, a liquid capsule coating composition may include less than 5.0 wt. %, less than 4.0 wt. less than 3.5 wt. %, less than 3.0 wt. %, less than 2.5 wt. %, less than 2.0 wt %, 1.5 wt. %, less than 1.0 wt. %, less than 0.9 wt %, less than 0.8 wt %, less than 0.7 wt. %, less than 0.6 wt %, less than 0.5 wt. %, less than 0.4 wt %, less than 0.3 wt. %, or less than 0.2 wt. % anti-tacking agent.

Capsule coating compositions according to embodiments provided herein may include a hydration aid. A hydration aid may help achieve faster dissolution of the capsule in the gastric environment by accelerating hydration. Suitable hydration aids may include Kollidon PVP12, Kollidon VA64, PEG 1000, low viscosity hydroxypropyl methylcellulose, and crystalline mannitol. In some embodiments, a dry capsule coating composition on a capsule may include from 2 to 50 wt. %, from 5 to 40 wt. %, or from 10 to 30 wt. % hydration aid to total solids. In some embodiments, a dry capsule coating composition on a capsule may include less than 50 wt. %, less than 45 wt. %, less than 40 wt. %, less than 35 wt. %, less than 30 wt. %, less than 25 wt. %, less than 20 wt. %, less than 15 wt. %, less than 10 wt. %, or less than 5 wt. % hydration aid to total solids. In some embodiments, a dry capsule coating composition on a capsule may include more than 2 wt %, more than 5 wt. %, more than 10 wt. %, more than 15 wt. %, more than 20 wt. %, more than 25 wt. %, more than 30 wt. %, more than 35 wt. %, more than 40 wt. %, or more than 45 wt. % hydration aid to total solids.

In some embodiments, a liquid capsule coating composition (i.e., in solution, prior to drying on the surface of a capsule) may include from 0.1 to 5.0 wt. %, from 0.2 to 3.0 wt. %, or from 0.3 to 1.0 wt. % hydration aid. In some embodiments, a liquid capsule coating composition may include more than 0.1 wt. %, more than 0.2 wt. %, more than 0.3 wt. %, more than 0.4 wt. %, more than 0.5 wt. %, more than 0.6 wt. %, more than 0.7 wt %, more than 0.8 wt. %, more than 0.9 wt. %, more than 1.0 wt. %, more than 1.5 wt. %, more than 2.0 wt. %, more than 2.5 wt. %, more than 3.0 wt. %, or more than 4.0 wt. % hydration aid. In some embodiments, a liquid capsule coating composition may include less than 5.0 wt %, less than 4.0 wt. %, less than 3.5 wt. %, less than 3.0 wt. %, less than 2.5 wt. %, less than 2.0 wt. %, 1.5 wt. %, less than 1.0 wt. %, less than 0.9 wt. %, less than 0.8 wt. %, less than 0.7 wt. %, less than 0.6 wt. %, less than 0.5 wt %, less than 0.4 wt. %, less than 0.3 wt. %, or less than 0.2 wt. % hydration aid.

Capsule coating compositions according to embodiments provided herein may be soluble in a variety of solvents. For example, capsule coating compositions may be soluble in aqueous solvents and/or organic solvents. Examples of suitable solvents include isopropyl alcohol, acetone, and ethyl acetate. In some embodiments, a liquid coating composition in solution may include from 55 to 97 wt. % solvent. In some embodiments, a liquid coating composition in solution may include more than 55 wt. %, more than 60 wt. %, more than 65 wt. %, more than 70 wt. %, more than 75 wt. %, more than 80 wt. %, more than 85 wt. %, more than 90 wt. %, or more than 95 wt. % solvent. In some embodiments, a liquid coating composition in solution may include less than 97 wt. %, less than 95 wt. %, less than 90 wt. % less than 85 wt. %, less than 80 wt. %, less than 75 wt. %, less than 70 wt. %, less than 65 wt. %, or less than 60 wt. % solvent.

Capsule coating compositions according to embodiments provided herein may include additional components other than those already described above. For example, a pH-modifying buffer may be used to help accelerate dissolution of the coating in a mild acid (i.e., in a gastric environment). Examples of pH-modifying buffers may include an imidazole-based buffer or an imidazole- or histatide-titrated with carboxylic acid buffer system. Other components that may be included in the coating composition include, but are not limited to, colorants, flavors, opacifiers, and preservatives.

In addition to coating the capsule, gastric residence dosage forms including a sleeve may also include a sleeve coating. Much like the capsule coating composition described above, a sleeve coating composition may promote dissolution in a gastric environment. In some embodiments, a sleeve coating composition and a capsule coating composition may be the same. In some embodiments, the sleeve coating composition may include a hydration aid to lower the dissolution time of the sleeve in a gastric environment to more rapidly release the gastric residence system in the patient's stomach. In some embodiments, a sleeve coating composition may comprise a hydrophilic and/or hygroscopic polymer or alternatively a hygroscopic wetting agent or humectant. Polymeric examples may include polysaccharide-based polymers such as hydroxypropyl methylcellulose, carboxymethylcellulose, starch, pectin, chitosan, alginate, other natural or semi-synthetic polymers like gelatin collagen, silk fibroin and/or non-cellulosic synthetic polymers like polyethylene glycol, polyethyl glycol-polypropylene glycol di- and tri-block copolymers, polyvinylpyrrolidone, and derivatives thereof. Non-polymeric materials may include wetting agents and humectants including polysorbates, glycerol, propanediol, sugars such as sucrose, glucose, dextrose, mannitol, maltitol, mannose, and various salts.

Figures 6A, 6B, 6C, 6D:
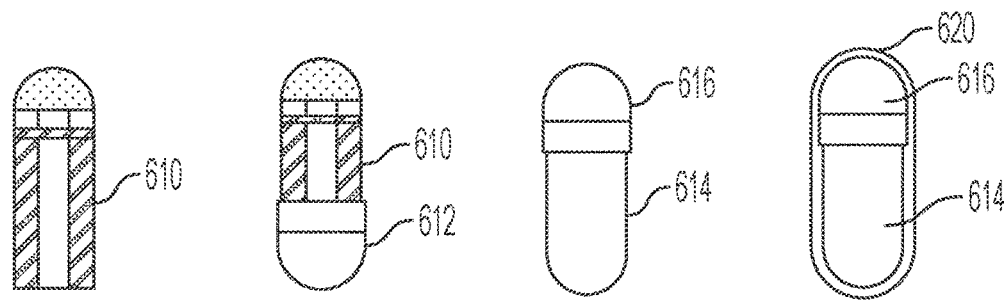
FIG. 6A shows a folded gastric residence system, according to some embodiments.
FIG. 6B shows a sleeved gastric residence system, according to some embodiments.
FIG. 6C shows an encapsulated gastric residence system, according to some embodiments.
FIG. 6D shows a coated encapsulated gastric residence system, according to some embodiments.

FIGS. 6A-6D show the steps of an encapsulation and coating process according to some embodiments. FIG. 6A shows gastric residence system 610 in a folded configuration. FIG. 6B shows gastric residence system 610 bound in a folded configuration with sleeve 612. In FIG. 6C, the sleeved gastric residence system is fully encapsulated in a capsule (comprising body 614 and cap 616). FIG. 6D shows the two-piece capsule (comprising body 614 and cap 616) coated with capsule coating 620.

Enrobing Encapsulated Gastric Residence Systems

Following is a description of coating compositions for enrobing folded gastric residence systems. In some embodiments, a coating composition may include a polymer, a plasticizer, a gelling agent and/or a solvent.

As used herein, the term "coating" may refer to "enrobing." "Enrobing" includes surrounding a folded gastric residence system with a softgel type shell material to form an "enrobed gastric residence system." "Coating" may also refer to a coating applied to the exterior of an enrobed gastric residence device.

Coating compositions for enrobing gastric residence systems have been developed according to embodiments provided herein to enhance gastric residence system deployment performance. Specifically, coating compositions for enrobing gastric residence systems have been developed to retain a gastric residence system in a compacted configuration between the time of administration and the time it reaches the stomach. Once the gastric residence dosage form reaches the stomach, the coating is designed to dissolve rapidly. A rapidly-dissolving coating can ensure that the gastric residence system is released within the stomach before passing through the pyloric valve.

Enrobed gastric residence dosage forms can offer various advantages over gastric residence systems encapsulated in conventional capsules. As mentioned above, a coating for enrobing a folded gastric residence system according to embodiments provided here can protect the therapeutic agent (and in this case, the gastric residence system) from tampering. Additionally, enrobed gastric residence dosage forms can be easier to swallow than gastric residence systems encapsulated only in conventional capsules, which can help reduce the transit time in the esophagus and minimize any chance of the gastric residence system releasing and unfolding in the esophagus.

Additionally, enrobing gastric residence systems with a coating composition according to embodiments provided herein allows for a slippery, non-adhesive surface for ease of swallowing (to prevent esophageal holdups) and a non-tacky and defect-free processing, storage, and shipment phases.

As described above, coating compositions according to embodiments provided herein are designed to protect a patient against esophageal deployment. For example, the deployment time of an enrobed gastric residence dosage form in an aqueous pH 7.0 environment (i.e., the approximate pH of the esophagus) may be from 15 to 120 minutes, from 20 to 60 minutes, or from 20 to 30 minutes. In some embodiments, the deployment time of an enrobed gastric residence dosage form in an aqueous pH 7.0 environment may be less than 120 minutes, less than 100 minutes, less than 80 minutes, less than 60 minutes, less than 50 minutes, less than 40 minutes, less than 30 minutes, less than 25 minutes, or less than 20 minutes. In some embodiments, the deployment time of an enrobed gastric residence dosage form in an aqueous pH 7.0 environment may be more than 15 minutes, more than 20 minutes, more than 25 minutes, more than 30 minutes, more than 40 minutes, more than 50 minutes, more than 60 minutes, more than 80 minutes, or more than 100 minutes.

Coating compositions according to embodiments provided herein can also be designed to rapidly dissolve in a gastric environment. As described above, once a gastric residence dosage form has reached the stomach, it should dissolve rapidly to allow the gastric residence system to deploy in the stomach. If the coating material fails to dissolve rapidly, then the gastric residence dosage form risks passing through the pyloric valve prior to releasing the gastric residence system. Accordingly, coating compositions according to embodiments provided herein are designed to dissolve rapidly and consistently. In some embodiments, the dissolution of the coating material has little or no reliance on a low pH.

For example, an enrobed gastric residence dosage form may deploy after residing in an aqueous pH 3.0 environment from 1 to 60 minutes, from 5 to 45 minutes, or from 10 to 30 minutes. In some embodiments, an enrobed gastric residence dosage form may deploy after residing in an aqueous pH 3.0 environment for more than 1 minutes, more than 2 minutes, more than 3 minutes, more than 4 minutes, more than 5 minutes, more than 10 minutes, more than 15 minutes, more than 20 minutes, more than 25 minutes, more than 30 minutes, more than 35 minutes, more than 40 minutes, more than 45 minutes, more than 50 minutes, or more than 55 minutes. In some embodiments, an enrobed gastric residence dosage form may deploy in an aqueous pH 3.0 environment for less than 60 minutes, less than 55 minutes, less than 50 minutes, less than 45 minutes, less than 40 minutes, less than 35 minutes, less than 30 minutes, less than 25 minutes, less than 20 minutes, less than 15 minutes, less than 10 minutes, less than 5 minutes, less than 4 minutes, less than 3 minutes, or less than 2 minutes.

The thickness of the coating for enrobing gastric residence devices in folded configurations may vary depending on desired properties of the enrobed gastric residence dosage form (e.g., deployment time). In some embodiments, the thickness of the coating enrobing the folded gastric residence system may be from 50 to 700 microns or from 150 to 350 microns thick. In some embodiments, the thickness of the coating enrobing the folded gastric residence system may be more than 50 microns, more than 100 microns, more than 150 microns, more than 200 microns, more than 250 microns, more than 300 microns, more than 350 microns, more than 400 microns, more than 450 microns, more than 500 microns, more than 550 microns, more than 600 microns, or more than 650 microns thick. In some embodiments, the thickness of the coating enrobing the folded gastric residence system may be less than 700 microns, less than 650 microns, less than 600 microns, less than 550 microns, less than 500 microns, less than 450 microns, less than 400 microns, less than 350 microns, less than 300 microns, less than 250 microns, less than 200 microns, less than 150 microns, or less than 100 microns thick. In some embodiments, the coating for enrobing folded gastric residence systems may provide a hermetic seal. For example, the coating may hermetically seal the folded gastric residence system to form an enrobed gastric residence dosage form. In some embodiments, the coating for enrobing folded gastric residence systems may comprise softgel type shell material.

Coating compositions according to embodiments provided herein may include a polymer, a plasticizer, a gelling agent, and/or water.

In some embodiments, the polymer may be pH-responsive polymer such as a water-based polymer dispersion or a reverse-enteric polymer. A suitable water-based polymer dispersion includes Kollicoat® Smartseal. A reverse-enteric polymer can encourage dissolution of the coating in the gastric environment and may provide a moisture barrier to the gastric residence system. The reverse-enteric polymer may also have desirable physiochemical dissolution properties, good film-forming capacity, and may be suitable for pharmaceutical coating methods (e.g., pan-coating). In some embodiments, polymethacrylates are suitable reverse-enteric polymers. For example, Eudragit® polymers may be suitable in some embodiments. Eudragit® polymers include a diverse range of polymethacrylate-based copolymers specifically formulated to aid in targeted drug release. In some embodiments, Eudragit® E, a specific type of polymethacrylate, may be a suitable reverse-enteric polymer. In particular, Eudragit® E dissolves in gastric fluid by the salt formation of its tertiary amine group in pH environments below 5.0. Thus, Eudragit® E can provide a suitable moisture barrier at neutral pH environments (i.e., in the mouth and esophagus). Other materials may also be suitable as a reverse-enteric polymer, such as those that ionize and/or solubilize in acidic environments to provide an enhanced rate of moisture permeation (i.e., access to the underlying capsule or coating layers). However, pH dependence is not a requirement of the polymer itself, but may be achieved with the addition of other excipients in the coating formulation. For example, the coating formulation may include small molecule additives with enhanced solubility at reduced pH (e.g., tertiary amine, imidazole-containing chemical entities, etc.). In some embodiments, the coating composition may include from 10 to 70 wt. %, from 20 to 60 wt. %, or from 30 to 50 wt. % polymer. In some embodiments, the coating composition may include less than 70 wt. %, less than 65 wt. %, less than 60 wt. %, less than 55 wt. %, less than 50 wt. %, less than 45 wt. %, less than 40 wt. %, less than 35 wt. %, less than 30 wt. %, less than 25 wt %, less than 20 wt. %, or less than 15 wt. % polymer. In some embodiments, the coating composition may include more than 10 wt. %, more than 15 wt. %, more than 20 wt. %, more than 25 wt. %, more than 30 wt. %, more than 35 wt. %, more than 40 wt. %, more than 45 wt. %, more than 50 wt. %, more than 55 wt. %, more than 60 wt. %, more than 65 wt. % more than 70 wt. %, more than 75 wt. %, more than 80 wt. %, or more than 85 wt. % polymer.

Plasticizers in the coating composition may reduce brittleness by enhancing the flexibility and resilience of the enrobed gastric residence dosage form. Suitable plasticizers may include phthalates, phosphates, citrates, tartrates, adipates, sebacates, sulfonamides, succinates, glycolates, glycerolates, benzoates, myristates, polyols, halogenated phenyls, and poloxamers. Specific compounds that may be used as a plasticizer in the coating formulation may include triacetin, triethyl citrate, polyethylene glycol, and dibutyl sebacate, glycerin, or sorbitol. In some embodiments, the coating composition may include from 10 to 70 wt. %, from 20 to 60 wt. %, or from 30 to 50 wt. % plasticizer. In some embodiments, the coating composition may include less than 70 wt. %, less than 65 wt. %, less than 60 wt. %, less than 55 wt %, less than 50 wt. %, less than 45 wt. %, less than 40 wt. %, less than 35 wt %, less than 30 wt. %, less than 25 wt. %, less than 20 wt. %, or less than 15 wt. % plasticizer. In some embodiments, the coating composition may include more than 10 wt. %, more than 15 wt. %, more than 20 wt. %, more than 25 wt. %, more than 30 wt. %, more than 35 wt. %, more than 40 wt. %, more than 45 wt. %, more than 50 wt. %, more than 55 wt %, more than 60 wt. %, more than 65 wt. % more than 70 wt. %, more than 75 wt. %, more than 80 wt. %, or more than 85 wt. % plasticizer.

Coating compositions according to embodiments provided herein include a gelling agent. For example, suitable gelling agents may include gelatin, pullulan, hydroxypropyl methylcellulose, and/or potato starch. If gelatin is used as the gelling agent, the bloom strength of the gelatin may be from 100 to 300 or from 150 to 250. In some embodiments, the bloom strength of the gelatin may be more than 100, more than 150, more than 200, or more than 250. In some embodiments, the bloom strength of the gelatin may be less than 300, less than 250, less than 200, or less than 150.

In some embodiments, the coating composition may include from 30 to 80 wt. %, from 40 to 70 wt. %, or from 50 to 60 wt. % gelling agent. In some embodiments, the coating composition may include less than 80 wt. %, less than 75 wt. %, less than 70 wt. %, less than 65 wt. %, less than 60 wt. %, less than 55 wt. %, less than 50 wt. %, less than 45 wt. %, less than 40 wt. %, or less than 35 wt. % gelling agent. In some embodiments, the coating composition may include more than 30 wt. %, more than 35 wt. %, more than 40 wt. %, more than 45 wt. %, more than 50 wt. %, more than 55 wt. %, more than 60 wt. %, more than 65 wt. %, more than 70 wt. %, or more than 75 wt. % gelling agent.

Coating compositions according to embodiments provided herein may additionally include water. The coating composition may include from 1 to 30 wt. %, from 5 to 25 wt. %, or from 10 to 20 wt. % water. In some embodiments, the coating composition may include less than 30 wt. %, less than 25 wt. %, less than 20 wt. %, less than 15 wt. %, less than 10 wt. %, or less than 5 wt. % water. In some embodiments, the coating composition may include more than 1 wt. %, more than 5 wt. %, more than 10 wt. %, more than 15 wt. %, more than 20 wt. %, or more than 25 wt. % water.

Coating compositions according to embodiments provided herein may include additional components other than those already described above. For example, opacifiers, colorants, flavors, and/or preservatives may also be used in coating compositions described herein. A suitable opacifier may include titanium dioxide. Suitable colorants may include FDA-approved dyes and lakes. Suitable flavors include ethyl vanillin and sucrose. Suitable preservatives include parabens, such as methyl paraben or propyl paraben.

Encapsulation and Coating Process

Figure 7:
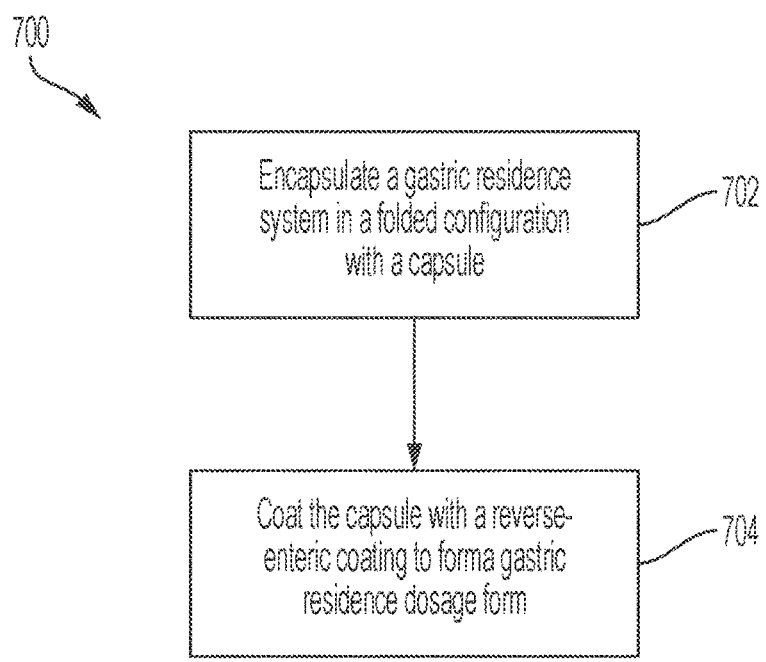
FIG. 7 shows a method of making a gastric residence dosage form, according to some embodiments.

Gastric residence systems may be encapsulated and/or coated using any suitable encapsulation and/or coating technique. FIG. 7 provides a schematic showing a method 600 of preparing a gastric residence dosage form according to some embodiments.

In step 702 of the method for preparing a gastric residence dosage form, a folded gastric residence system is encapsulated in a capsule. In particular, step 702 of the method may include folding the gastric residence system and inserting the folded gastric residence system into a container. Step 702 may be performed either manually or mechanically. Folding the gastric residence system may include compacting or compressing the gastric residence system into its folded configuration. Inserting the gastric residence system into a container may include inserting the compacted gastric residence system into a capsule or other container of appropriate size.

In some embodiments, methods for preparing a gastric residence dosage form may include receiving the foldable gastric residence system in an unfolded form. For example, the foldable gastric residence system can be received at a vibratory bowl feeder or a pick and place conveyor. In some embodiments, methods for preparing a gastric residence dosage form may include orienting the gastric residence system into a folding position. Methods may also include folding the gastric residence system into a folded configuration. Once the gastric residence dosage form is in a folded configuration, the folded gastric residence dosage form may be inserted into an opening of a container. Processes for encapsulating gastric residence systems are provided in further detail in Application PCT/US2018/051816, the entirety of which is incorporated herein.

In step 704 of the method for preparing a gastric residence dosage form, an encapsulated gastric residence system may be coated with a reverse-enteric coating.

For example, a pan-coating process may be used to coat the encapsulated gastric residence systems. In some embodiments, an LDCS 48098/Freund-Vector pan coater may be used with a 1.5 L pan size, a SCHLICK ABC LDCS-FP HCC-6869-3 spray gun, and peroxide-cured silicone pump tubing to coat the encapsulated gastric residence systems. In some embodiments, empty capsules may be coated before they are used to encapsulate gastric residence systems.

Several processing conditions may be specified during the pan-coating process. Processing conditions include inlet temperature, exhaust temperature, coater airflow, pan speed, pump speed, atomization pressure, pattern pressure, spray rate, drying pan speed, and drying time in pan. For example, the inlet temperature may be from 30 to 70° C., from 35 to 65° C., or from 40 to 60° C. In some embodiments, the inlet temperature may be less than 70° C., less than 65° C., less than 60° C., less than 55° C., less than 50° C., or less than 45° C. In some embodiments, the inlet temperature may be more than 30° C., more than 35° C., more than 40° C., more than 45° C. or more than 50° C.

The exhaust temperature may be from 20° C. to 60° C., from 25° C. to 50° C., or from 30 to 40° C. In some embodiments, the exhaust temperature may be less than 60° C., less than 50° C., less than 40° C., or less than 30° C. In some embodiments, the exhaust temperature may be more than 20° C., more than 30° C. more than 40° C., or more than 50° C.

The coater airflow may be from 20 to 80 cubic feet per minute (CFM), from 30 to 70 CFM, or from 40 to 60 CFM. In some embodiments, the coater airflow may be less than 80 CFM, less than 70 CFM, less than 60 CFM, less than 50 CFM, or less than 40 CFM. In some embodiments, the coater airflow may be more than 20 CFM, more than 30 CFM, more than 40 CFM, more than 50 CFM, or more than 60 CFM.

The pan speed may be from 10 to 50 rpm, from 15 to 40 rpm, or from 20 to 30 rpm. In some embodiments, the pan speed may be more than 10 rpm, more than 15 rpm, more than 20 rpm, more than 30 rpm, or more than 40 rpm. In some embodiments, the pan speed may be less than 50 rpm, less than 40 rpm, less than 30 rpm, less than 20 rpm, or less than 15 rpm.

The pump speed may be from 2 to 15 rpm, from 3 to 12 rpm, or from 5 to 10 rpm. In some embodiments, the pump speed may be more than 2 rpm, more than 3 rpm, more than 5 rpm, or more than 10 rpm. In some embodiments, the pump speed may be less than 15 rpm, less than 12 rpm, less than 10 rpm, or less than 5 rpm.

The atomization pressure may be from 10 to 40 pounds per square inch (psi), from 15 to 35 psi, or from 20 to 30 psi. In some embodiments, the atomization pressure may be more than 10 psi, more than 15 psi, more than 20 psi, or more than 25 psi. In some embodiments, the atomization pressure may be less than 40 psi, less than 35 psi, less than 30 psi, less than 25 psi, or less than 20 psi.

The pattern pressure may be from 10 to 40 psi, from 15 to 35 psi, or from 20 to 30 psi. In some embodiments, the pattern pressure may be more than 10 psi, more than 15 psi, more than 20 psi, or more than 25 psi. In some embodiments, the pattern pressure may be less than 40 psi, less than 35 psi, less than 30 psi, less than 25 psi, or less than 20 psi.

The spray rate may be from 1 to 10 grams per minute (g/min) or from 3 to 8 g/min. In some embodiments, the spray rate may be more than 1 g/min, more than 2 g/min, more than 3 g/min, more than 4 g/min, or more than 5 g/min. In some embodiments, the spray rate may be less than 10 g/min, less than 8 g/min, less than 6 g/min, less than 5 g/min, or less than 4 g/min.

The drying pan speed may be from 1 to 30 rpm, from 3 to 20 rpm, or from 5 to 10 rpm. In some embodiments, the drying pan speed may be more than 1 rpm, more than 2 rpm, more than 3 rpm, more than 4 rpm, more than 5 rpm, more than 8 rpm, more than 10 rpm, or more than 15 rpm. In some embodiments, the drying pan speed may be less than 30 rpm, less than 25 rpm, less than 20 rpm, less than 15 rpm, less than 10 rpm, less than 8 rpm, or less than 5 rpm.

The total drying time in pan may be from 15 to 120 minutes, from 30 to 100 minutes, or from 45 to 80 minutes. In some embodiments, the total drying time in pan may be more than 15 minutes, more than 30 minutes, more than 45 minutes, more than 60 minutes, or more than 80 minutes. In some embodiments, the total drying time in pan may be less than 120 minutes, less than 100 minutes, less than 80 minutes, less than 60 minutes, or less than 45 minutes. In some embodiments, the drying time may be continuous. In some embodiments, the drying time may be discontinuous.

The capsule coating may comprise from 0.2 to 15 wt. %, from 0.5 to 10 wt. %, or from 1 to 5 wt. % of the total gastric residence dosage form. In some embodiments, the capsule coating may comprise more than 0.2 wt. %, more than 0.5 wt. %, more than 0.8 wt. %, more than 1.0 wt. %, more than 1.5 wt. %, more than 2.0 wt. %, more than 2.5 w. %, more than 3.0 wt. %, more than 3.5 wt. %, more than 4.0 wt. %, or more than 4.5 wt. % of the total gastric residence dosage form. In some embodiments, the capsule coating may comprise less than 5.0 wt. %, less than 4.5 wt. %, less than 4.0 wt. %, less than 3.5 wt. %, less than 3.0 wt. %, less than 2.5 wt. %, less than 2.0 wt. %, less than 1.5 wt. %, less than 1.0 wt. %, less than 0.8 w. %, or less than 0.5 wt. % of the total gastric residence dosage form.

EXAMPLES

Provided below are various examples of the capsules and capsule coatings according to embodiments provided herein.

Example 1: Provided below are testing data for various capsule coating compositions. Specifically, the data show the effects that different types and amounts of hydration aid can have on dissolution of the capsule in both neutral (i.e., esophageal) and acidic (i.e., gastric) pH environments. Additionally, the data show tackiness of the capsules on storage, pan-coating processability observations, and static coefficient of friction (i.e., effects on swallowing). The polymer used was Eudragit® E, the anti-tacking agent was magnesium stearate, the plasticizer was triacetin, and the solvent used was isopropyl alcohol. The testing was performed according to the techniques discussed in detail further below.

TABLE 1

Hydration aid testing results.

| % w/w hydration aid to total solids | % w/w Eudragit E polymer to total solids | Deployment (min) pH 3.0 Rocker | Deployment (min) pH 7.0 Rocker | 40° C./75 relative humidity Tackiness | Pan-coating Processability | CoF @ 2 min hold |
|---|---|---|---|---|---|---|
| 8.3% Kollidon 12 | 83 | 20.1 ± 2.9 | 56.1 ± 22.6 | No | Yes | 0.06 ± 0.01 |
| 15.4% Kollidon 12 | 77 | 18 ± 2.3 | 58.9 ± 15.6 | No | Yes | 0.05 ± 0.01 |
| 31.3% Kollidon 12 | 62.5 | 15.9 ± 2.1 | 33.6 ± 9.5 | No | Yes | 0.06 ± 0.00 |
| 18.5% VA64 | 74.1 | 20.6 ± 2.6 | 36 ± 4 | No | Yes | 0.05 ± 0.01 |
| 31.3% VA64 | 62.5 | 16.4 ± 0.7 | 20.8 ± 2.5 | No | Yes | 0.06 ± 0.01 |
| 21.4% PEG1000 | 71.4 | 17.1 ± 2 | 46.6 ± 16.2 | 2 capsules stuck to bottle | Capsules agglomerated during drying cycle | 0.06 ± 0.01 |
| 31.3% Mannitol 25C | 62.5 | 17.7 ± 2.3 | 48.8 ± 18 | No | Yes | 0.08 ± 0.02 |
| 21.4% HPMC 15 cP | 71.4 | 19.1 ± 2.3 | 38.7 ± 18 | No | Yes | 0.13 ± 0.03 |

Example 2: Different types of capsules were tested for deployment time. Both unsleeved gastric residence systems and sleeved gastric residence systems were tested. The sleeved gastric residence systems were sleeved on the arm side of the compacted/folded gastric residence system. As shown in Table 2 below, gelatin capsules (Coni-Snap®), HPMC capsules (VCaps® Plus), and pullulan capsules (Plantcaps®) were tested. In addition to deployment time, observations on dissolution were also obtained. The sleeves used were size 0EL VCaps® Plus HPMC. The testing was performed according to the techniques discussed in detail further below.

TABLE 2

Capsule testing results.

|  | GELATIN (Coni-Snap ®) | HPMC (VCaps ® Plus) | PULLULAN (Plantcaps ®) |
|---|---|---|---|
| Deployment Time of CAPSULE only with Unsheeved Gastric Residence System; pH 3M Rocker | 13.1 ± 3 min (n = 3) | 2.2 ± 0.4 min (n = 3) | 1.6 ± 0.3 min (n = 3) |
| Rocker Deployment Time of CAPSULES + SLEEVED Gastric Residence System; pH 3.0 Rocker | 15.8 ± 3.8 min (n = 3) | 7.4 ± 2.8 min (n = 3) | 7.5 ± 0.4 min (n = 3) |
| Dissolution behavior | Slowly swells, softens but stays intact, non-sticky and floats | Rapidly disperses, becomes sticky, settles and disintegrates | Rapidly softens into a gel, disintegrates and slowly dissolves |
| Source | Animal derived | Plant derived | Plant derived |

Example 3: The deployment time of gastric residence systems comprising a filament and sleeved on the arm-side of and the deployment time of gastric residence systems comprising a filament and sleeved on the core side was tested. Specifically, some gastric residence systems, such as stellate-shaped gastric residence systems, are configured to compact/fold at the core. Thus, when compacted/folded, the gastric residence system has an arm side and a core side (e.g., as shown in FIGS. 2, 5A-5C, and 6A). The example described herein tests the deployment time for gastric residence systems that are compacted and sleeved on an arm side and gastric residence systems that are compacted and sleeved on a core side.

FIGS. 8A-8G shows different sleeving and encapsulation configurations for gastric residence systems comprising a filament. Specifically, FIG. 8A shows a compacted/folded gastric residence system 810A that is being sleeved on an arm side with sleeve 812A. Compacted/folded gastric residence system 810A comprises a filament between each arm of the gastric residence system. Thus, the filament of the gastric residence system is covered by sleeve 812A. FIG. 8B shows gastric residence system 810A sleeved with sleeve 812A on the arm side of the gastric residence system to form sleeved compacted/folded gastric residence system 840B. FIG. 8C shows a compacted/folded gastric residence system 810C. However, compacted/folded gastric residence system 810C is shown being sleeved on the core side of the gastric residence system with sleeve 812C. FIG. 8D shows compacted/folded gastric residence system 810D sleeved with sleeve 812C on the core side of the gastric residence system. Thus, unlike sleeved compacted/folded gastric residence system 840B of FIG. 8B, the webbing of compacted/folded gastric residence system 810C is not covered by sleeve 812C in sleeved compacted/folded gastric residence system 840D.

FIGS. 8E and 8F show different encapsulation configurations for sleeved compacted/folded gastric residence systems. Both sleeved compacted/folded gastric residence system 840E of FIG. 8E and sleeved compacted/folded gastric residence system 840F of FIG. 8F are sleeved on an arm side of the gastric residence system. Further, FIG. 8E shows sleeved gastric residence system 840E being encapsulated with a two-piece capsule. The cap of the two-piece capsule, cap 816E, is shown encapsulating the sleeved gastric residence system on its core side, and the body of the two-piece capsule, body 814E, is shown encapsulating the sleeved gastric residence system on its sleeved arm side. FIG. 8F shows sleeved gastric residence system 840F being encapsulating with a two-piece capsule. However, unlike that of FIG. 8E, the sleeved compacted/folded gastric residence system 840F of FIG. 8F is being encapsulated with the body of the two-piece capsule, body 814F, encapsulating the core side, and the cap of the two-piece capsule, cap 816F encapsulating the sleeved arm side of the gastric residence system.

FIG. 8G shows an encapsulated sleeved compacted/folded gastric residence system 842G.

The sleeve used in these trials were VCaps® Plus HPMC size 0. The sleeved gastric residence systems were then encapsulated with a VCaps® Plus 00EL HPMC two-piece capsule. Below, Table 3 shows deployment time data for arm-side sleeved gastric residence systems, and Table 4 shows deployment time data for core-side sleeved gastric residence systems. The data of both Tables 3 and 4 was obtained using the Deployment (Rocker) test at pH 7, described in further detail below.

TABLE 3

Arm-side sleeve deployment results.

| Capsule # | Deployment time (min) |
|---|---|
| 1 | 95.3 |
| 2 | 78.7 |
| 3 | 83.6 |
| 4 | 68.6 |
| 5 | 67.0 |
| Average | 78.6 |
| StDev | 11.6 |

TABLE 4

Core-side sleeve deployment results.

| Capsule # | Deployment time (min) |
|---|---|
| 1 | 87.8 |
| 2 | 130.7 |
| 3 | 107.7 |
| 4 | 81.9 |
| 5 | 55.6 |
| 6 | 71.0 |
| 7 | 101.0 |
| 8 | 84.8 |
| 9 | 85.7 |
| 10 | 59.0 |

| TABLE 4-continued |  |
|---|---|
| Core-side sleeve deployment results. | |
| Capsule # | Deployment time (min) |
| Average | 86.5 |
| StDev | 22.5 |

As shown in Tables 3 and 4, the deployment time of core-side sleeved gastric residence systems and arm-side sleeved gastric residence systems are similar. Although the average deployment time of core-side sleeved gastric residence systems is slightly greater than that of arm-side sleeved gastric residence systems, the difference is not enough to be statistically significant. Thus, the deployment time of arm-side gastric residence systems and the deployment time of core-side gastric residence systems, based on the data of Tables 3 and 4, may each be suitable and in some embodiments provide for similar outcomes.

Example 4: The deployment time of gastric residence dosage forms comprising a coated capsule with were tested with both sleeved and unsleeved gastric residence systems to evaluate the effect of the sleeve on deployment time. Based on the data reproduced in Table 5 below, the sleeved gastric residence systems took about an additional 6-7 minutes to deploy in both a pH 7.0 environment (i.e., esophageal) and a pH 3.0 environment (i.e., gastric). The sleeve that was used for the sleeved gastric residence systems was a size 0 VCaps® Plus HPMC. The testing was performed according to the techniques discussed in detail further below.

TABLE 5

| Deployment time for sleeve and unsleeved gastric devices. | | |
|---|---|---|
|  | with sleeve* | without sleeve |
| pH 7 Rocker Deployment Time | 64.4 ± 14 min (n = 8) | 57.5 ± 6.2 min (n = 4) |
| pH 3 Rocker Deployment Time | 27.6 ± 3 min (n = 8) | 21.2 ± 1.5 min (n = 4) |

Example 5: Two different anti-tacking agents, talc and magnesium stearate, were tested for static coefficient of friction and deployment time. Twenty two weight-percent talc to total solids was used and 4.6 wt. % magnesium stearate to total solids was used. The reverse-enteric, low-friction static coefficient polymer coatings tested may help increase slipperiness of a dosage form when used to coat the capsule. Anti-tacking agents, and in particular, magnesium stearate, may also help increase the slipperiness of a dosage form by lowering the static coefficient of the dosage form. A more slippery dosage form (i.e., having a lower static coefficient of friction) can help minimize the risk of pill esophagitis. The testing was performed according to the techniques discussed in detail further below.

Further, the static coefficient of friction at two minutes for uncoated VCaps® Plus HPMC capsule was 0.35±0.04. However, the static coefficient of friction of VCaps® Plus HPMC capsule coated with a formulation containing Eudragit E, dibutyl sebacate and magnesium stearate was 0.06±0.01. This data indicates that a reverse-enteric coating of Eudragit E in presence of magnesium stearate and dibutyl sebacate is efficient in reducing friction during swallowing of an HPMC capsule.

Figure 9:
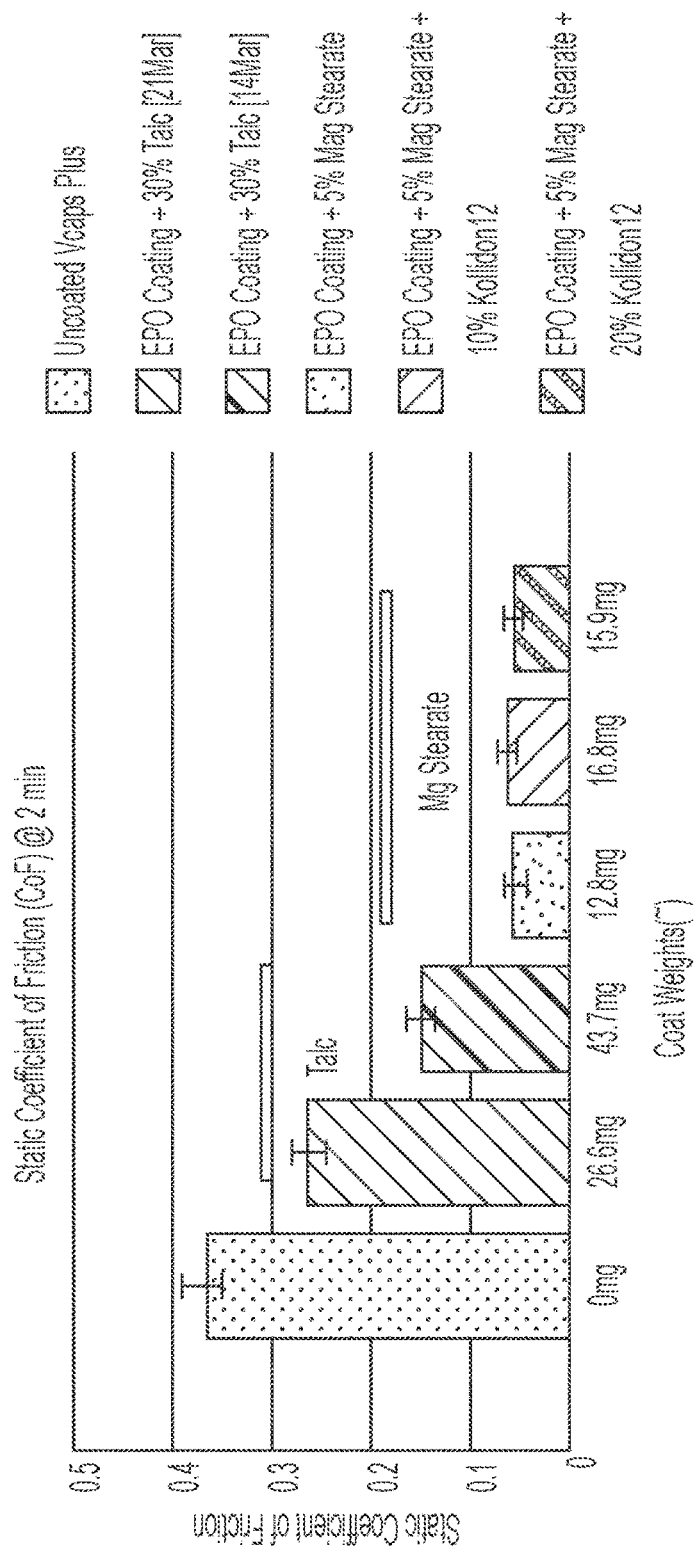
FIG. 9 shows static coefficient of friction data for different coating formulations, according to some embodiments.

As shown in FIG. 9, both the dosage forms having the talc coating and the dosage forms having the magnesium stearate coating have lower static coefficients of friction when moist than the uncoated dosage form, indicating that both talc and magnesium stearate help make the dosage form easier to swallow.

Below, in Table 6, the results show that both the talc-comprising coating and the magnesium stearate-comprising coating yield acceptable deployment times in both a weakly acidic gastric environment (i.e., 3.0 pH) and an esophageal environment (i.e., pH 7.0).

TABLE 6

| Deployment time of coated gastric residence dosage forms including either talc or magnesium stearate. | | |
|---|---|---|
| Deployment Time (min) | pH 3.0 | pH 7.0 |
| Talc coating (23 mg) | 20.5 ± 2.1 min | 75 ± 11 min |
| Mg Stearate coating (13 mg) | 16.9 ± 2.6 min | 58.7 ± 11.3 min |

Figure 10A:
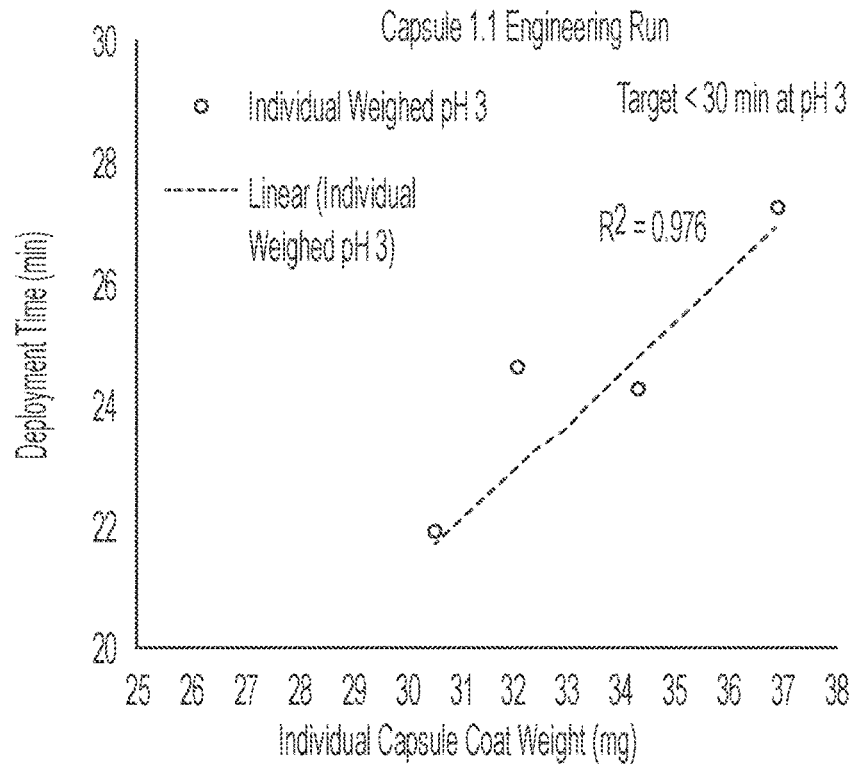
FIGS. 10A and 10B show data on gastric residence dosage form deployment time for various coating weights, according to some embodiments.
Figure 10B:
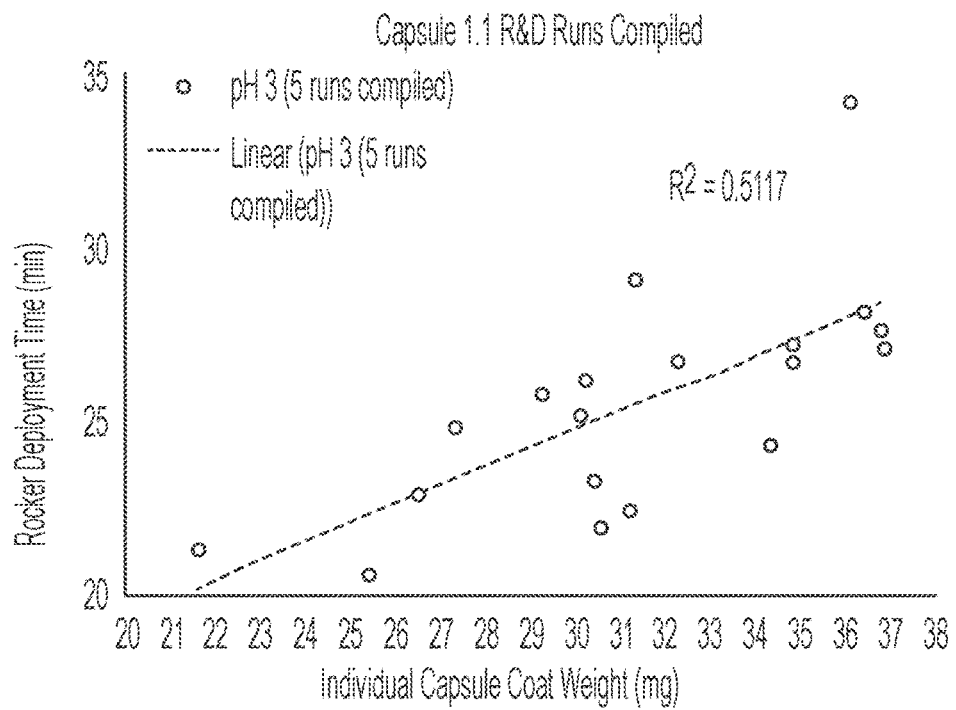

Example 6: FIGS. 10A and 10B show relationships between gastric residence dosage form deployment time and the total weight of the coating on the dosage form. As shown in both Figures, as the individual coating weight of the gastric residence dosage form increases, so too does the deployment time of the dosage form. The data in both FIG. 10A and FIG. 10B were obtained by conducting a deployment test at pH 3.0 (i.e., weakly-acidic gastric environment). The details of the deployment test are discussed in more detail below.

Example 7: Gastric residence dosage forms were dropped to test how physical impact (e.g., due to processing, transport, etc.) may affect deployment time. Two groups of gastric residence dosage forms were tested: one group was dropped and one group was not dropped. As shown in Table 7 below, dropping the gastric residence dosage forms did not significantly impact the deployment time of the gastric residence dosage forms in an aqueous pH 7.0 environment. This shows that the coating is robust enough to maintain protection against esophageal deployment even after experiencing a physical impact. The details of the drop test and the deployment test are discussed in more detail below.

TABLE 7

| Deployment time of dropped and undropped gastric residence dosage forms. | | | | |
|---|---|---|---|---|
| Group | pH | Sample ID | Deployment Time (mm) | Average Deployment Time (min) |
| Not Dropped | 7 | 1 | 46.45 | 53.75 |
|  |  | 2 | 46.8 |  |
|  |  | 3 | 68 |  |
| Dropped | 7 | 1 | 64.23 | 59.04 |
|  |  | 2 | 52.62 |  |
|  |  | 3 | 60.28 |  |

Example 8: Coated gastric residence dosage forms according to embodiments provided herein were compared to uncoated gastric residence dosage forms. In particular, the deployment times of coated and uncoated gastric residence dosage forms were tested in aqueous pH 3.0 and aqueous pH 7.0 environments. FIG. 10 provides results of this test. The uncoated gastric residence dosage forms were prepared using a VCaps® Plus sleeve and a VCaps® Plus capsule. The coated gastric residence dosage forms were prepared using a VCaps® Plus sleeve, a VCaps® Plus capsule, and were coated with a reverse-enteric coating according to embodiments provided herein. In particular, the reverse-enteric coating included magnesium stearate as the anti-tacking agent, Eudragit® E PO as the reverse-enteric polymer, and dibutyl sebacate as the plasticizer. The reverse-enteric coating did not include a hydration aid. The deployment test was conducted with a lactate buffer; further details of the deployment test are provided below.

Figure 11:
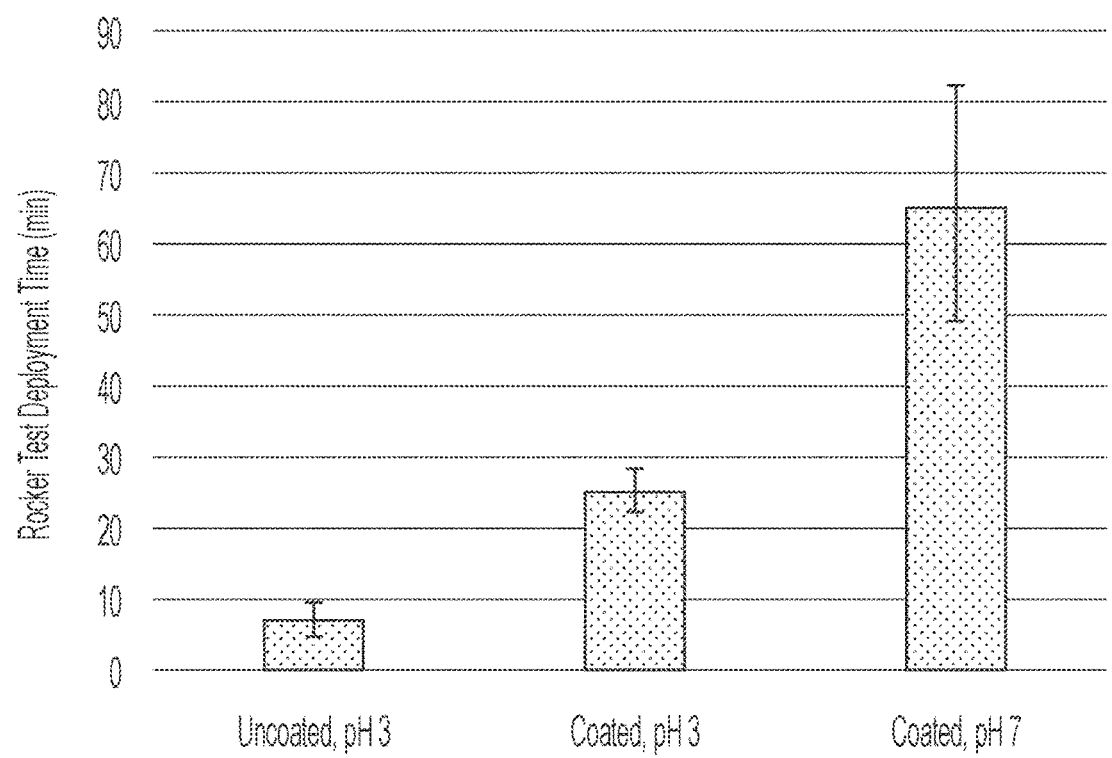
FIG. 11 shows data comparing coated gastric residence dosage forms and uncoated gastric residence dosage forms, according to some embodiments.

As shown in FIG. 11, the deployment times for the coated gastric residence dosage forms at both an aqueous pH 3.0 environment and an aqueous pH 7.0 environment were greater than the deployment time of the uncoated gastric residence dosage form at an aqueous pH 3.0 environment. It can be assumed that the deployment time of an uncoated gastric residence dosage form at an aqueous pH 3.0 environment and at an aqueous 7.0 environment will be approximately the same.

Example 9: Two types of gelatin shell formulations were evaluated for enrobing gastric residence systems. The components of the two formulations are provided in Table 8, below. The key difference in the two formulations was their bloom strength and the presence of a low molecular weight (3-6 kD) gelatin hydrolysate. The low molecular weight gelatin hydrolysate can allow faster hydration. Prior to enrobing, gastric residence systems were folded/encapsulated in four different capsule and sleeve configurations shown in Table 9, below. Enrobing was performed on each of the folded configurations for both gelatin formulations.

TABLE 8

Two gelatin shell formulations used for enrobing gastric residence systems.

| Reagent | Formulation 1 (APP073119) | Formulation 2 (APP072619) |
| --- | --- | --- |
| 150 Bloom Lime Bone Gelatin | present | N/A |
| 115 Bloom Lime Bone Gelatin RXL R^2 | N/A | present |
| Gelatin Hydrolysate | present | N/A |
| Glycerin, USP | present | present |
| Purified Water | present | present |
| Expected Bloom (g) | 150-170 | 92-138 |

TABLE 9

Configurations of folded gastric residence system.
Sz 00EL VCaps Plus Capsule, Sz 0 VCaps Plus Sleeve.

| Sublot | Folded Gastric Residence System Configuration (encapsulation) |
| --- | --- |
| A | 1 sleeve (arm-side), with capsule |
| B | No sleeve, with capsule |
| C | 1 sleeve (aim-side), no capsule |
| D | 2 sleeves (arm- & core-side), no capsule |

Figure 12:
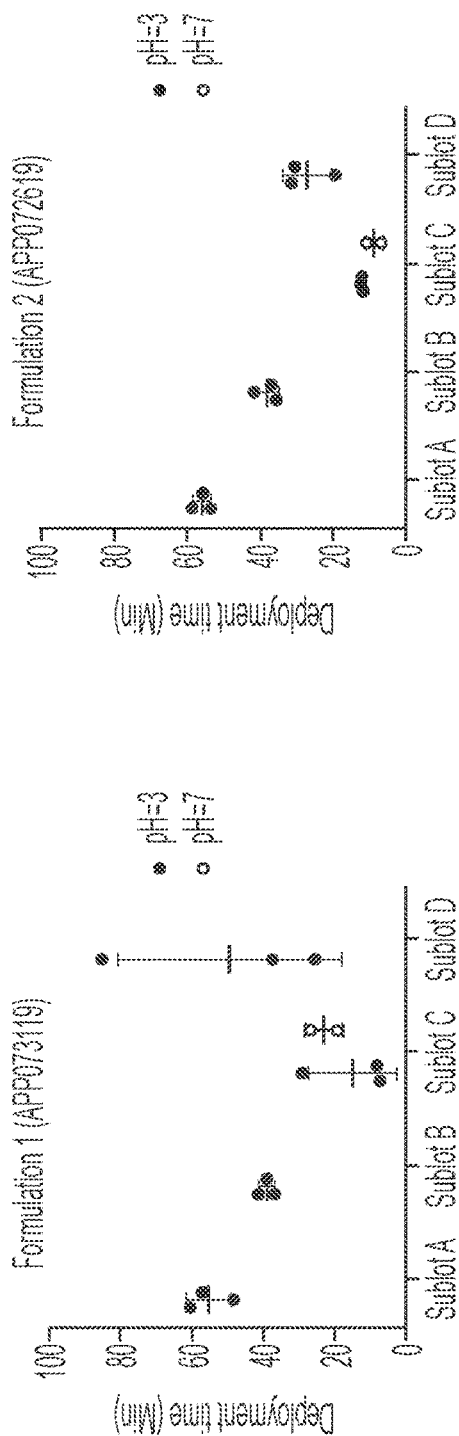
FIG. 12 shows the uncoated deployment times for two enrobing formulations.

The enrobed gastric residence systems were evaluated for appearance, dimension, and deployment timing at pH 3 (to simulate deployment in weak gastric pH conditions). FIG. 12 shows the uncoated deployment times for both enrobing formulations. No significant difference was observed between the two formulations in terms of appearance and dimensions. No significant difference in deployment times at pH 3 for Sublots A & B. However, the deployment times at pH 3 for Sublots C & D have higher variability for Formulation 1 with the hydrolysate compared to Formulation 2. Sublot C enrobed gastric residence systems exhibit the fastest deployment times for both formulations. All uncoated enrobed gastric residence systems deployed in less than 60 mins at pH 3, except one in Formulation 1—Sublot D. Sublot D took 85 mins to deploy at pH 3.

The deployment time of Sublot C enrobed gastric residence systems was also evaluated at pH 7, which simulates esophageal environment, to assess the pH responsiveness of the enrobing formulations. For both formulations, there was no significant impact of pH on deployment time.

Figure 13:
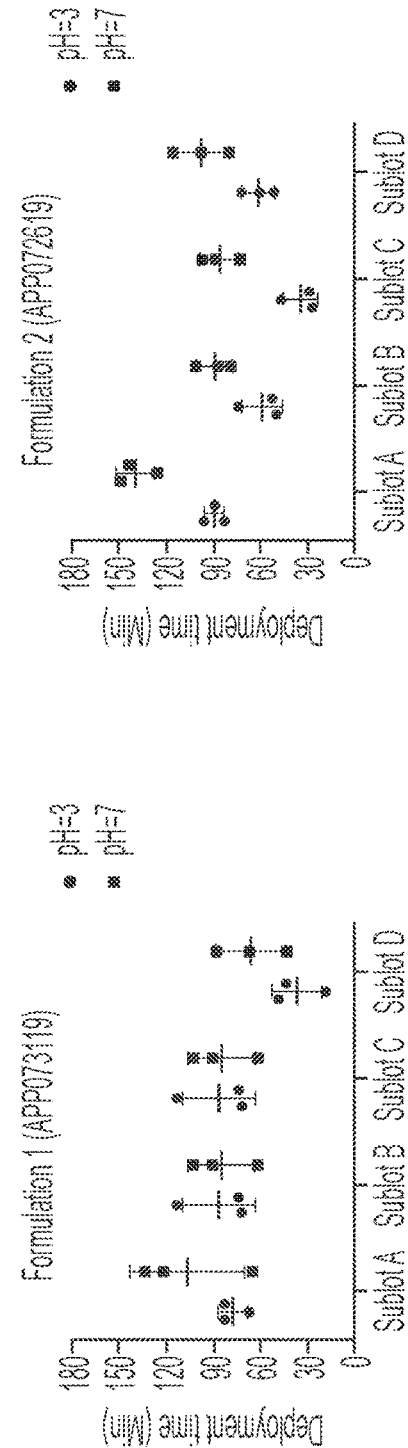
FIG. 13 shows deployment times at both pH 3 & pH 7 for the two enrobing formulations also depicted in FIG. 12.

Gastric residence systems enrobed with both formulations were then coated with an Eudragit E based pH responsive coating. The processability, appearance and deployment times of the coated enrobed gastric residence systems were assessed (as shown in FIG. 13 & Table 10). Gastric residence systems enrobed with the hydrolysate containing formulation 1 showed cracks in the shell after the pan-coating process. Formulation 2 enrobed gastric residence systems did not show any cracking and had slightly higher coating weight gain indicating better coating adherence.

FIG. 13 shows the deployment times at both pH 3 & pH 7 for both enrobing formulations. Formulation 1 enrobed gastric residence systems don't show pH responsive behavior for Sublots A. B & C post-coating. However, coated enrobed gastric residence systems with Formulation 2 show pH responsive behavior for all Sublots.

For example, in case of Formulation 2 Subplot C, the average deployment time is 36±11 min at pH 3 and 87±12 min at pH 7. This provides a two-fold differential in deployment time at pH 7 compared to pH 3 for this group of gastric residence systems. Such a pH responsive behavior of coated enrobed gastric residence systems can provide sufficient delay at esophageal pH while allowing rapid deployment in the gastric environment.

TABLE 10

Pan-coating processability observations of enrobed gastric residence systems.

| Enrobing Formulation | 1 (APP07319) | | | | 2 (APP072619) | | | |
| --- | --- | --- | --- | --- | --- | --- | --- | --- |
| Sublot | A | B | C | D | A | B | C | D |
| Coating Weight Gain (mg) | 33.5 | 32.5 | 26.8 | 25.3 | 35.6 | 36.8 | 29.3 | 30 |
| Appearance after coating | Good | Good | cracks in shell | cracks in shell | Good | Good | Good | Good |

Testing Methods

Deployment Test: Deployment time is defined as the amount of time it takes a gastric residence system to assume an open configuration. To measure deployment time, gastric residence dosage forms can be placed in 35 mL of the specified media on a laboratory rocker. Specifically, a 450 mL jar comprising an 80 mm diameter, a 94 mm height, and a polytetrafluoroethylene-lined lid was used. Once the gastric residence dosage form was placed into the jar with the 35 mL media, the jar was sealed, inverted, and immediately placed on the laboratory rocker. The laboratory rocker was set at 30 cycles per minute.

Various media were used depending on the testing conditions desired. In some tests, a phosphate buffered saline solution was used at either a pH of 7.0 (to replicate a human esophageal pH condition) or a pH of 3.0 (to replicate a human gastric weak acidic pH condition). The 7.0 pH solution was prepared by dissolving 1.36 grams of monobasic potassium phosphate, anhydrous, and 8.41 grams of sodium chloride in water and adjusting to pH 7.0 with sodium hydroxide, then diluting to a final volume of 1.0 liters with water. The 3.0 pH solution was prepared by dissolving 1.36 grams of monobasic potassium phosphate, anhydrous, and 8.41 grams of sodium chloride in water and adjusting to pH 3.0 with hydrochloric acid, then diluting to a final volume of 1.0 liters with water.

Deployment tests were also conducted using a media of hydrochloric acid (pH 1.5) with sodium chloride to replicate a human gastric strong acidic pH condition. This solution was prepared by dissolving 9.00 grams of sodium chloride in a solution of 1.5 pH hydrochloric acid to a final volume of 1.0 liters.

Tack on Storage: To measure tack, coated capsules were placed in containers and stored for a specified duration (i.e., 1 week to 1 month). Five to ten coated capsules were placed in each container and sealed with a twist-off cap having an integral foil liner. The containers used were 40 cc or 60 cc wide-mouth pharmaceutical round bottles (Drug Plastics Corp.). The coated capsules were held in the containers in a controlled chamber (e.g., humidity, temperature). Specific storage conditions that were tested include: room temperature with low relative humidity (i.e., less than 40%) and no rayon coil; room temperature with high relative humidity (i.e., greater than 70%) and no rayon coil; room temperature with ambient relative humidity and a rayon coil, and 40° C. with 75% relative humidity. Tack on storage was evaluated by opening the cap at the conclusion of the specified duration and inverting the bottle to visually observe the sticking behavior of the stored coated capsules.

Drop Test (Friability Test): Coated capsules were dropped through a two-foot long piece of polyvinyl chloride (PVC) pipe onto a hard bench surface. The PVC pipe had a diameter of approximately 1.5 inches. Each coated capsule was dropped five to ten times on each rounded end. After each drop, the coated capsules were inspected under a microscope to observe any delamination or cracking.

Figure 14A:
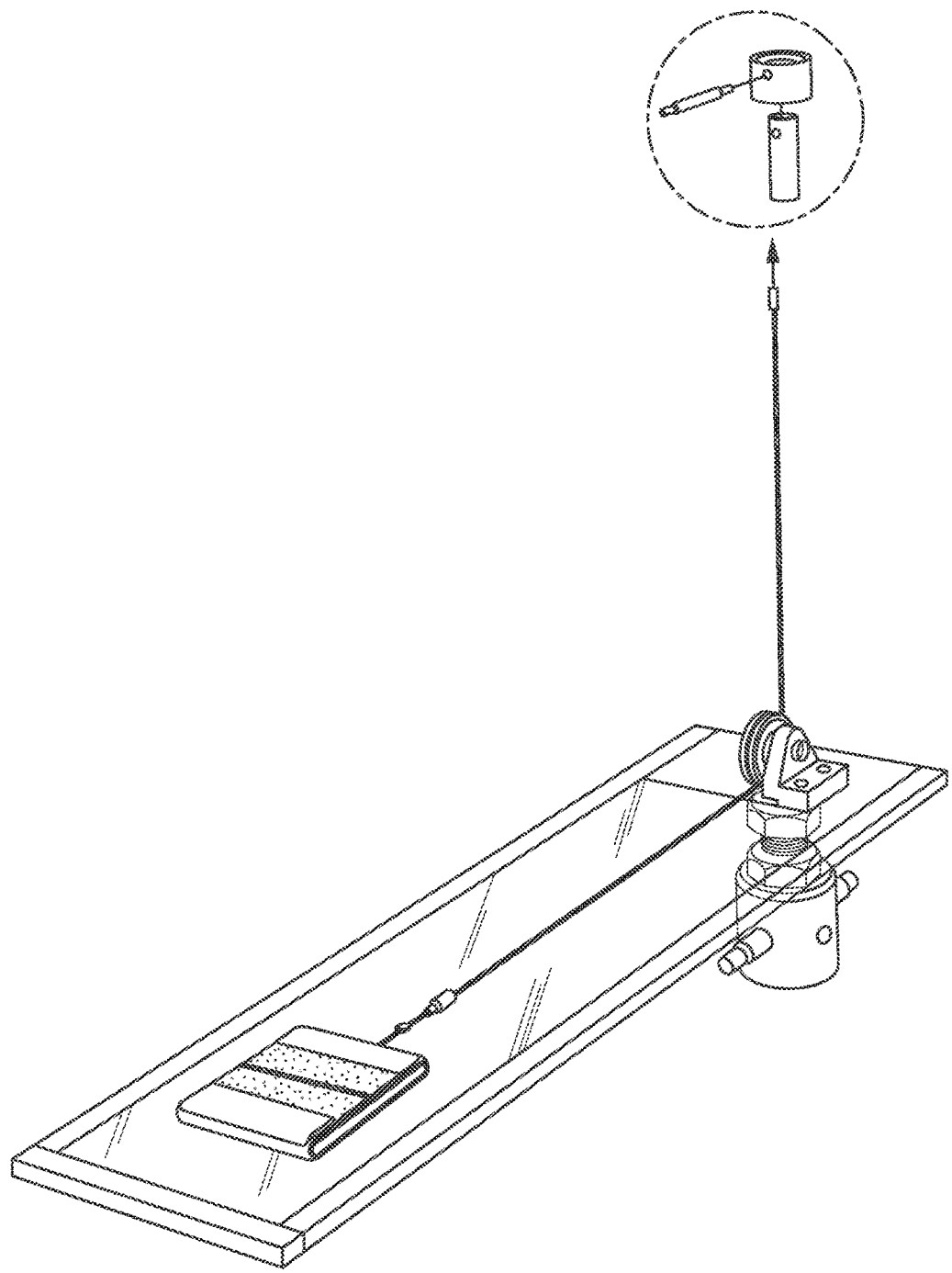
FIG. 14A shows an Instron testing tool as used to test deployment time, according to some embodiments.
Figure 14B:
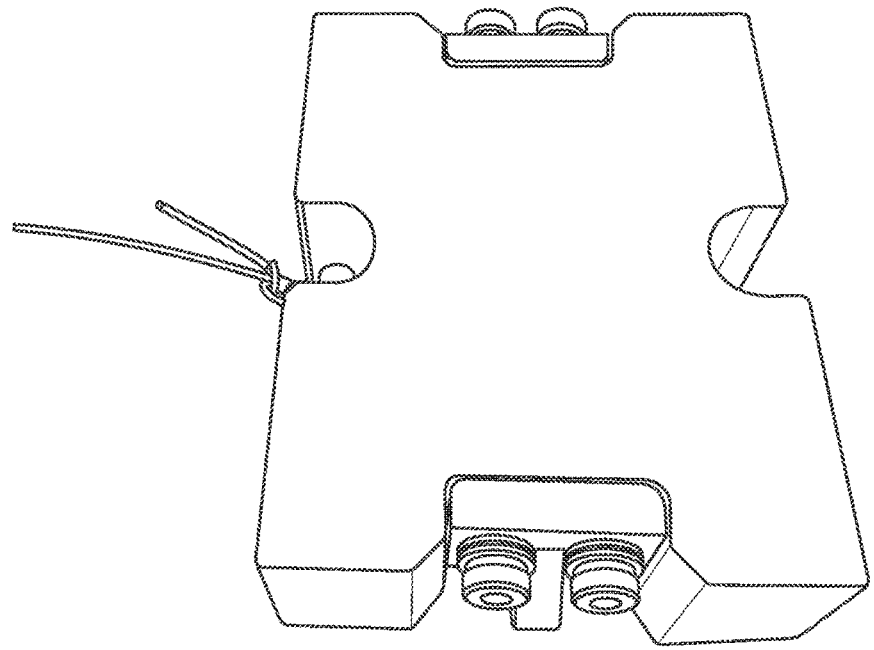
FIG. 14B shows a view of a custom sled for testing static coefficient of friction, according to some embodiments.
Figure 14C:
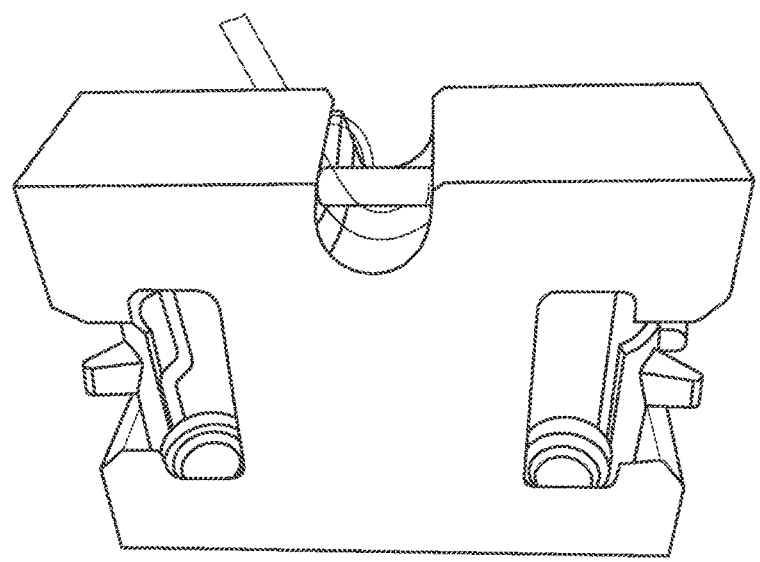
FIG. 14C shows a view of a custom sled for testing static coefficient of friction, according to some embodiments.

Friction Test: Squares of approximate three inches by three inches were cut from sausage casing (LEM products Smoked Clear Edible Collagen Casing) and soaked in deionized water for at least 30 minutes. One square was cut for each sample to be tested. An Instron tensile testing machine (Model 3342), shown in FIG. 14A, was used with the static coefficient of friction fixture (standard add-on) and a 10 N load cell. A custom sled was used to hold two capsules oriented horizontally in direct contact with the casing surface. FIGS. 14B and 14C show the custom sled.

For each capsule sample, a hydrated casing square was laid on the testing surface and flattened by wiping with a rubber scraper from the center to each edge to remove any air bubbles and excess liquid located between the casing and the testing surface. Two capsule samples were inserted into the slots on the custom machined sled. The sled was attached to a nylon cord. The cord was passed through the fixture pulley and up to the hook on the 10 N load cell attached to the Instron crosshead. The sled was placed down on the casing, with only the two capsules contacting the casing, in an orientation such that the direction of movement as axial with respect to the capsules. The sled was let rest in place for a specified amount of time. Generally, the sled was let to rest in place for times from 2 to 10 minutes, to reflect various swallowing times.

At the end of the hold time, the crosshead was caused to move upward at a speed of 150 mm/min, pulling the sled forward on the testing surface until a travel distance of 15 mm was reached. The peak force which brought the sled in to motion was measured. The static coefficient of friction for each pair of capsules was calculated by dividing the peak force by the normal force exerted by gravity on the sled and capsules (the normal force exerted by gravity on the sled and capsules was determined based on sled and capsule weight). The static coefficients of friction for each capsule group were averaged and compared.

Embodiments

The invention is further described by the following embodiments. The features of each of the embodiments are combinable with any of the other embodiments where appropriate and practical.

Embodiment 1. A gastric residence dosage form comprising: a gastric residence system in a folded configuration; a capsule encapsulating the gastric residence system in the folded configuration; and a coating on the capsule, wherein the gastric residence dosage form is configured to release the gastric residence system in a stomach of a patient, allowing the gastric residence system to assume an open configuration.

Embodiment 2. The gastric residence dosage form of embodiment 1, wherein the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

Embodiment 3. The gastric residence dosage form of embodiment 2, wherein the first amount of time is at least 1 minute greater than the second amount of time.

Embodiment 4. The gastric residence dosage form of embodiment 2, wherein the gastric residence dosage form allows the gastric residence system to assume the open configuration in at least 20 minutes when exposed to the aqueous pH 7.0 environment.

Embodiment 5. The gastric residence dosage form of embodiment 2 or 4, wherein the gastric residence dosage form allows the gastric residence system to assume the open configuration in at least 30 minutes when exposed to the aqueous pH 7.0 environment.

Embodiment 6. The gastric residence dosage form of any of embodiments 1-5, wherein the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

Embodiment 7. The gastric residence dosage form of embodiment 6, wherein the third amount of time is at least 15 seconds greater than the fourth amount of time.

Embodiment 8. The gastric residence dosage form of embodiment 6 or 7, wherein the gastric residence dosage form allows the gastric residence system to assume the open configuration in less than 30 minutes when exposed to the aqueous pH 3.0 environment.

Embodiment 9. The gastric residence dosage form of any of embodiments 6-8, wherein the gastric residence dosage form allows the gastric residence system to assume the open configuration in less than 15 minutes when exposed to the aqueous pH 3.0 environment.

Embodiment 10. The gastric residence dosage form of any of embodiments 1-9, comprising a sleeve, wherein the sleeve surrounds at least a portion of the gastric residence system in the folded configuration.

Embodiment 11. The gastric residence dosage form of any of embodiments 1-10, wherein the coating comprises a reverse-enteric polymer.

Embodiment 12. The gastric residence dosage form of embodiment 11, wherein the reverse-enteric polymer comprises a polymethacrylate-based polymer.

Embodiment 13. The gastric residence dosage form of any of embodiments 1-12, wherein the coating comprises an anti-tacking agent.

Embodiment 14. The gastric residence dosage form of embodiment 13, wherein the anti-tacking agent comprises at least one of talc or magnesium stearate.

Embodiment 15. The gastric residence dosage form of any of embodiments 1-14, wherein the coating comprises a plasticizer.

Embodiment 16. The gastric residence dosage form of embodiment 15, wherein the plasticizer comprises at least one of a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

Embodiment 17. The gastric residence dosage form of embodiment 15 or 16, wherein the plasticizer comprises at least one of triacetin or dibutyl sebacate.

Embodiment 18. The gastric residence dosage form of any of embodiments 1-17, wherein the coating comprises a hydration aid.

Embodiment 19. The gastric residence dosage form of embodiment 18, wherein the hydration aid comprises at least one of a polyvinylpyrrolidone, a vinylpyrrolidone-vinyl acetate copolymer, a polyethylene glycol, mannitol, or hydroxypropyl methylcellulose.

Embodiment 20. The gastric residence dosage form of any of embodiments 1-19, wherein the coating comprises from 50 to 95 wt. % reverse-enteric polymer.

Embodiment 21. The gastric residence dosage form of any of embodiments 1-20, wherein the coating comprises from 3 to 25 wt. % anti-tacking agent.

Embodiment 22. The gastric residence dosage form of any of embodiments 1-21, wherein the coating comprises from 1 to 20 wt. % plasticizer.

Embodiment 23. The gastric residence dosage form of any of embodiments 1-22, wherein the coating comprises from 3 to 35 wt. % hydration aid.

Embodiment 24. The gastric residence dosage form of embodiment 10, wherein the sleeve comprises at least one of gelatin, hydroxypropyl methylcellulose, or pullulan.

Embodiment 25. The gastric residence dosage form of any of embodiments 1-24, wherein the capsule comprises at least one of gelatin, hydroxypropyl methylcellulose, or pullulan.

Embodiment 26. The gastric residence dosage form of any of embodiments 1-25, wherein the gastric residence dosage form is used to treat a patient.

Embodiment 27. The gastric residence dosage form of embodiment 26, wherein the patient is a human.

Embodiment 28. A coating for an encapsulated gastric residence system, the coating comprising: 50-95 wt. % reverse-enteric polymer; 3-25 wt. % anti-tacking agent; and 1-20 wt. % plasticizer.

Embodiment 29. The coating of embodiment 28, wherein the coating is on a surface of a capsule, forming a coated capsule.

Embodiment 30. The coating of embodiment 29, wherein the coated capsule encapsulates a gastric residence system to form a gastric residence dosage form, wherein the gastric residence dosage form is configured to release the gastric residence system in a stomach of a patient, allowing the gastric residence system to assume an open configuration.

Embodiment 31. The coating of any of embodiments 28-30, comprising 5 to 35 wt. % hydration aid.

Embodiment 32. The coating of embodiment 31, wherein the hydration aid comprises at least one of a polyvinylpyrrolidone, a vinylpyrrolidone-vinyl acetate copolymer, a polyethylene glycol, mannitol, or hydroxypropyl methylcellulose.

Embodiment 33. The coating of any of embodiments 28-32, wherein the reverse-enteric polymer comprises a polymethacrylate-based polymer.

Embodiment 34. The coating of any of embodiments 28-33, wherein the anti-tacking agent comprises at least one of talc or magnesium stearate.

Embodiment 35. The coating of any of embodiments 28-34, wherein the plasticizer comprises a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

Embodiment 36. The coating of any of embodiments 28-35, wherein the plasticizer comprises at least one of triacetin and dibutyl sebacate.

Embodiment 37. The coating of any of embodiments 28-36, wherein the coating is soluble in an aqueous solution.

Embodiment 38. The coating of any of embodiments 28-37, wherein the coating is soluble in an organic solution.

Embodiment 39. The coating of any of embodiments 30-38, wherein the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

Embodiment 40. The coating of embodiment 39, wherein the first amount of time is at least 1 minute greater than the second amount of time.

Embodiment 41. The coating of embodiment 39 or 40, wherein the gastric residence dosage form allows the gastric residence system to assume the open configuration in at least 20 minutes when exposed to the aqueous pH 7.0 environment.

Embodiment 42. The coating of any of embodiments 39-41, wherein the gastric residence dosage form allows the gastric residence system to assume the open configuration in at least 30 minutes when exposed to the aqueous pH 7.0 environment.

Embodiment 43. The coating of any of embodiments 30-42, wherein the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

Embodiment 44. The coating of embodiment 43, wherein the third amount of time is at least 15 seconds greater than the fourth amount of time.

Embodiment 45. The coating of embodiment 43 or 44, wherein the gastric residence dosage form allows the gastric residence system to assume the open configuration in less than 30 minutes when exposed to the aqueous pH 3.0 environment.

Embodiment 46. The coating of any of embodiments 43-45, wherein the gastric residence dosage form allows the gastric residence system to assume the open configuration in less than 15 minutes when exposed to the aqueous pH 3.0 environment.

Embodiment 47. A gastric residence dosage form comprising the coating of any of embodiments 30-46, wherein the gastric residence dosage form is used to treat a patient.

Embodiment 48. The gastric residence dosage form of embodiment 47, wherein the patient is a human.

Embodiment 49. A method of making a gastric residence dosage form comprising: encapsulating a gastric residence system in a folded configuration with a capsule; and coating the capsule with a reverse-enteric coating to form a gastric residence dosage form.

Embodiment 50. The method of embodiment 49, comprising binding the gastric residence system in the folded configuration with a sleeve prior to encapsulating.

Embodiment 51. The method of embodiment 49 or 50, wherein coating the capsule with a reverse-enteric coating comprises pan-coating the capsule.

Embodiment 52. The method of any of embodiments 49-51, wherein the reverse-enteric coating comprises a reverse-enteric polymer, an anti-tacking agent, and a plasticizer.

Embodiment 53. The method of embodiment 52, wherein the anti-tacking agent comprises at least one of talc or magnesium stearate.

Embodiment 54. The method of embodiment 52 or 53, wherein the plasticizer comprises at least one of a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

Embodiment 55. The method of any of embodiments 52-54, wherein the plasticizer comprises at least one of triacetin or dibutyl sebacate.

Embodiment 56. The method of any of embodiments 49-55, wherein the reverse-enteric coating comprises a hydration aid.

Embodiment 57. The method of embodiment 56, wherein the hydration aid comprises at least one of a polyvinylpyrrolidone, a vinylpyrrolidone-vinyl acetate copolymer, a polyethylene glycol, mannitol, or hydroxypropyl methylcellulose.

Embodiment 58. The method of any of embodiments 49-57, wherein the capsule comprises at least one of gelatin, hydroxypropyl methylcellulose, or pullulan.

Embodiment 59. The method of embodiment 50, wherein the sleeve comprises at least one of gelatin, hydroxypropyl methylcellulose, or pullulan.

Embodiment 60. The method of any of embodiments 49-59, wherein the gastric residence dosage form is configured to release the gastric residence system in a stomach of a patient, allowing the gastric residence system to assume an open configuration.

Embodiment 61. The method of any of embodiments 60, wherein the gastric residence dosage form allows the gastric residence system to assume the open configuration in a first amount of time when exposed to an aqueous pH 7.0 environment, and the first amount of time is greater than a second amount of time for an uncoated gastric residence dosage form comprising an uncoated capsule to allow a gastric residence system to assume an open configuration when the uncoated gastric residence dosage form is exposed to the aqueous pH 7.0 environment.

Embodiment 62. The method of embodiment 61, wherein the first amount of time is at least 1 minute greater than the second amount of time.

Embodiment 63. The method of embodiment 60 or 61, wherein the gastric residence dosage form allows the gastric residence system to assume the open configuration in at least 20 minutes when exposed to the aqueous pH 7.0 environment.

Embodiment 64. The method of any of embodiments 60-63, wherein the gastric residence dosage form allows the gastric residence system to assume the open configuration in at least 30 minutes when exposed to the aqueous pH 7.0 environment.

Embodiment 65. The method of any embodiments 60-64, wherein the gastric residence dosage form allows the gastric residence system to assume the open configuration in a third amount of time when exposed to an aqueous pH 3.0 environment, and the third amount of time is greater than a fourth amount of time for an uncoated gastric residence dosage form comprising an uncoated capsule to allow a gastric residence system to assume an open configuration when the uncoated gastric residence dosage form is exposed to the aqueous pH 3.0 environment.

Embodiment 66. The method of embodiment 65, wherein the third amount of time is at least 15 seconds greater than the fourth amount of time.

Embodiment 67. The method of embodiment 65 or 66, wherein the gastric residence dosage form allows the gastric residence system to assume the open configuration in less than 30 minutes when exposed to the aqueous pH 3.0 environment.

Embodiment 68. The method of any of embodiments 65-67, wherein the gastric residence dosage form allows the gastric residence system to assume the open configuration in less than 15 minutes when exposed to the aqueous pH 3.0 environment.

Embodiment 69. A gastric residence dosage form made using the method of any of embodiments 49-68, wherein the gastric residence dosage form is used to treat a patient.

Embodiment 70. The gastric residence dosage form of embodiment 69, wherein the patient is a human.

Embodiment 71. A coated dosage form comprising: a dosage form; and a coating comprising a reverse-enteric polymer coating the dosage form, wherein $$\frac{\text{static coefficient of friction of coated dosage form}}{\text{static coefficient of friction of uncoated dosage form}} \leq 08.$$

Embodiment 72. The coated dosage form of embodiment 71, wherein the coating comprises magnesium stearate.

Embodiment 73. The coated dosage form of embodiment 71 or 72, wherein the dosage form comprises one of a tablet, a capsule, or an enrobed gastric residence system.

Embodiment 74. The coated dosage form of embodiment 73, wherein the dosage form comprises a capsule.

Embodiment 75. The coated dosage form of embodiment 74, wherein the capsule encapsulates a gastric residence system.

Embodiment 76. The coated dosage form of any of embodiments 71-75, wherein a static coefficient of friction of the coated dosage form is less than 0.3.

Embodiment 77. The coated dosage form of embodiment 71-76, wherein the static coefficient of friction of the coated dosage form is less than 0.2.

Embodiment 78. The coated dosage form of embodiment 71-77, wherein the static coefficient of friction of the coated dosage form is less than 0.1.

Embodiment 79. The coated dosage form of any of embodiments 71-78, wherein $$\frac{\text{static coefficient of friction of coated dosage form}}{\text{static coefficient of friction of uncoated dosage form}} \leq 05.$$

Embodiment 80. The coated dosage form of any of embodiments 71-79, wherein the static coefficient of friction is at least 0.08 less than that of an uncoated dosage form.

Embodiment 81. The coated dosage form of any of embodiments 71-80, wherein the static coefficient of friction of the coated dosage form is at least 0.15 less than that of an uncoated dosage form.

Embodiment 82. The coated dosage form of any of embodiments 71-81, wherein the static coefficient of friction of the coated dosage form is at least 0.2 less than that of an uncoated dosage form.

Embodiment 83. The coated dosage form of any of embodiments 71-82, wherein the reverse-enteric polymer comprises a polymethacrylate.

Embodiment 84. The coated dosage form of any of embodiments 71-83, the coating comprises 10 to 50 wt. % reverse-enteric polymer.

Embodiment 85. The coated dosage form of any of embodiments 71-84, wherein the coating comprises an anti-tacking agent.

Embodiment 86. The coated dosage form of any of embodiments 71-85, wherein the anti-tacking agent comprises talc.

Embodiment 87. The coated dosage form of embodiments 85 or 86, the coating comprises 5 to 30 wt. % anti-tacking agent.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X".

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A gastric residence dosage form comprising:
  a gastric residence system in a folded configuration;
  a sleeve surrounding at least a portion of the gastric residence system in the folded configuration, wherein the sleeve is configured to bind the gastric residence system into the folded configuration;
  a capsule encapsulating the gastric residence system in the folded configuration; and
  a coating on the capsule,
  wherein the gastric residence dosage form is configured to release the gastric residence system in a stomach of a patient, allowing the gastric residence system to assume an open configuration.

2. The gastric residence dosage form of claim 1, wherein the gastric residence dosage form allows the gastric residence system to assume the open configuration in a first amount of time when exposed to an aqueous pH 7.0 environment, and the first amount of time is greater than a second amount of time for the gastric residence dosage form to allow the gastric residence system to assume an open configuration when exposed to an aqueous pH 3.0 environment.

3. The gastric residence dosage form of claim 1, wherein the coating comprises a reverse-enteric polymer.

4. The gastric residence dosage form of claim 3, wherein the reverse-enteric polymer comprises a polymethacrylate-based polymer.

5. The gastric residence dosage form of claim 1, wherein the coating comprises 3 to 25 wt. % anti-tacking agent.

6. The gastric residence dosage form of claim 1, wherein the coating comprises from 1 to 20 wt. % plasticizer.

7. The gastric residence dosage form of claim 1, wherein the coating comprises from 3 to 35 wt. % hydration aid.

8. The gastric residence dosage form of claim 1, wherein the sleeve comprises at least one of gelatin, hydroxypropyl methylcellulose, or pullulan.

9. The gastric residence dosage form of claim 1, wherein the gastric residence dosage form is used to treat a human.

10. The gastric residence dosage form of claim 1, wherein the coating comprises from 50 to 95 wt. % reverse-enteric polymer.

11. The gastric residence dosage form of claim 1, wherein the coating comprises an anti-tacking agent.

12. The gastric residence dosage form of claim 11, wherein the anti-tacking agent comprises at least one of talc or magnesium stearate.

13. The gastric residence dosage form of claim 1, wherein the coating comprises a plasticizer.

14. The gastric residence dosage form of claim 13, wherein the plasticizer comprises at least one of a phthalate, a phosphate, a citrate, a tartrate, an adipate, a sebacate, a sulfonamide, a succinate, a glycolate, a glycerolate, a benzoate, a myristate, a polyethylene glycol, a halogenated phenyl, or a poloxamer.

15. The gastric residence dosage form of claim 1, wherein the coating comprises a hydration aid.

16. The gastric residence dosage form of claim 15, wherein the hydration aid comprises at least one of a polyvinylpyrrolidone, a vinylpyrrolidone-vinyl acetate copolymer, a polyethylene glycol, mannitol, or hydroxypropyl methylcellulose.

17. The gastric residence dosage form of claim 1, wherein the capsule comprises at least one of gelatin, hydroxypropyl methylcellulose, or pullulan.

18. A method of making the gastric residence dosage form of claim 1 comprising:
    binding the gastric residence system into the folded configuration with the sleeve;
    encapsulating the gastric residence system in the folded configuration with the capsule; and
    coating the capsule with a reverse-enteric coating to form the gastric residence dosage form.

19. The method of claim 18, comprising binding the gastric residence system in the folded configuration with a sleeve prior to encapsulating.

20. The method of claim 18, wherein coating the capsule with a reverse-enteric coating comprises pan-coating the capsule.

* * * * *